US012124925B2

(12) United States Patent
Rho et al.

(10) Patent No.: US 12,124,925 B2
(45) Date of Patent: Oct. 22, 2024

(54) DYNAMIC ANALYSIS AND MONITORING OF MACHINE LEARNING PROCESSES

(71) Applicant: The Toronto-Dominion Bank, Toronto (CA)

(72) Inventors: Barum Rho, Toronto (CA); Kin Kwan Leung, Toronto (CA); Maksims Volkovs, Toronto (CA); Tomi Johan Poutanen, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 581 days.

(21) Appl. No.: 17/063,847

(22) Filed: Oct. 6, 2020

(65) Prior Publication Data

US 2022/0067580 A1  Mar. 3, 2022

Related U.S. Application Data

(60) Provisional application No. 63/074,078, filed on Sep. 3, 2020.

(51) Int. Cl.
*G06N 20/00* (2019.01)
*G06F 9/451* (2018.01)
*G06N 3/08* (2023.01)

(52) U.S. Cl.
CPC ............. *G06N 20/00* (2019.01); *G06F 9/451* (2018.02); *G06N 3/08* (2013.01)

(58) Field of Classification Search
CPC .......... G06N 20/00; G06N 3/08; G06N 20/20; G06N 3/02; G06N 3/088; G06F 9/451
See application file for complete search history.

(56) References Cited

U.S. PATENT DOCUMENTS 7,236,964 B2  6/2007  Labreuche
10,496,927 B2  12/2019  Achin et al.
(Continued)

FOREIGN PATENT DOCUMENTS

WO  2019204072  10/2019
WO  2020089597  5/2020

OTHER PUBLICATIONS

Adadi, et al.,"Peeking Inside the Black-Box: A Survey on Explainable Artificial Intelligence (XAI)," IEEE Access, vol. 6, Sep. 17, 2018, pp. S2138-S2160.
(Continued)

*Primary Examiner* — Roberto Borja
(74) *Attorney, Agent, or Firm* — Duane Morris LLP

(57) ABSTRACT

The disclosed embodiments include computer-implemented processes that flexibly and dynamically analyze a machine learning process, and that generate analytical output characterizing an operation of the machine learning process across multiple analytical periods. For example, an apparatus may receive an identifier of a dataset associated with the machine learning process and feature data that specifies an input feature of the machine learning process. The apparatus may access at least a portion of the dataset based on the received identifier, and obtain, from the accessed portion of the dataset, a feature vector associated with the machine learning process. The apparatus may generate a plurality of modified feature vectors based on the obtained feature vector, and based on an application of the machine learning process to the obtained and modified feature vectors, generate and transmit, to a device, first explainability data associated with the specified input feature for presentation within a digital interface.

21 Claims, 8 Drawing Sheets

(56) References Cited

U.S. PATENT DOCUMENTS

| | | | |
|---|---|---|---|
| 10,510,022 B1* | 12/2019 | Tharrington, Jr. | G06N 5/045 |
| 10,586,164 B1 | 4/2020 | Sengupta et al. | |
| 10,664,766 B2 | 5/2020 | Hammond et al. | |
| 10,706,329 B2 | 7/2020 | Anushiravani et al. | |
| 11,182,697 B1* | 11/2021 | Murakonda | G06N 20/00 |
| 2017/0249547 A1 | 8/2017 | Shrikumar et al. | |
| 2018/0322406 A1* | 11/2018 | Merrill | G06N 20/20 |
| 2018/0322417 A1* | 11/2018 | Bendre | H04L 67/60 |
| 2018/0357552 A1 | 12/2018 | Campos et al. | |
| 2019/0147369 A1 | 5/2019 | Gupta et al. | |
| 2019/0156216 A1 | 5/2019 | Gupta et al. | |
| 2019/0244122 A1 | 8/2019 | Li et al. | |
| 2019/0354853 A1 | 11/2019 | Zoldi et al. | |
| 2019/0370697 A1 | 12/2019 | Iyer | |
| 2019/0378210 A1 | 12/2019 | Merrill et al. | |
| 2020/0097439 A1 | 3/2020 | Sinay et al. | |
| 2020/0134368 A1 | 4/2020 | Chopra et al. | |
| 2020/0143005 A1 | 5/2020 | Nair et al. | |
| 2020/0380524 A1* | 12/2020 | Li | G06F 16/906 |
| 2021/0055977 A1* | 2/2021 | Lisuk | H04L 67/133 |
| 2021/0224605 A1* | 7/2021 | Zhang | G06N 20/00 |
| 2021/0241115 A1* | 8/2021 | Ibrahim | G06N 5/01 |
| 2021/0241200 A1* | 8/2021 | Carricato | G06N 5/04 |
| 2022/0012632 A1* | 1/2022 | Vasisht | G06N 20/00 |

OTHER PUBLICATIONS

Gunning, et al., "DARPA's Explainable Artificial Intelligence Program," AI Magazine, vol. 40, No. 2, Jun. 24, 2019, pp. 44-58.
Hendricks, et al., "Generating Visual Explanations," arXiv.org, vol. 1. Mar. 28, 2016, pp. 1-17.
International Search Report and Written Opinion mailed by the Canadian Intellectual Property Office in International Application No. PCT/CA/2021/050807 (4 pages).
Molnar, "Interpretable machine learning. A Guide for Making Black Box Models Explainable," Jul. 22, 2020 (3 pages).
Sarkar, "Model Interpretation Strategies," Oct. 31, 2018 (23 pages).
Hall et al., "Machine Learning Interpretability with H2O Driverless AI," Jul. 2020 (40 pages).

* cited by examiner

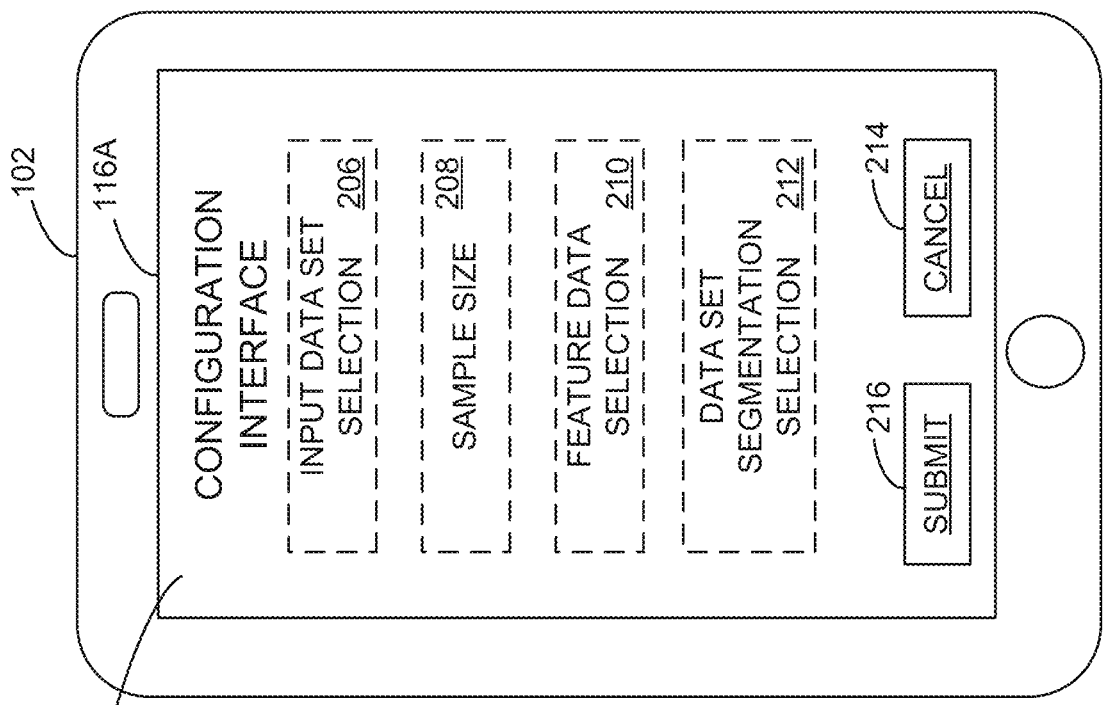

DYNAMIC ANALYSIS AND MONITORING OF MACHINE LEARNING PROCESSES

CROSS-REFERENCE TO RELATED APPLICATION

This application claims the benefit of priority to U.S. Provisional Patent Application No. 63/074,078, filed on Sep. 3, 2020, the entire disclosure of which is expressly incorporated herein by reference to its entirety.

TECHNICAL FIELD

The disclosed embodiments generally relate to computer-implemented systems and processes that dynamically analyze and monitor a machine learning model.

BACKGROUND

Machine learning models and artificial intelligence algorithms are widely adopted throughout the financial services industry. The output of these machine learning models informs not only decisions related to a targeting marketing of financial products and services to customers, but also a determination of a credit or insolvency risk associated with these customers or a suspiciousness of certain actions taken by these customers. Many machine learning models, however, operate as "black boxes," and lack transparency regarding the importance and relative impact of certain input features, or combinations of certain input features, on the operations of these machine learning models and on the output generated by these machine learning models.

SUMMARY

In some examples, an apparatus includes a memory storing instructions, a communications interface, and at least one processor coupled to the memory and the communications interface. The at least one processor is configured to execute the instructions to receive, from a device via the communications interface, an identifier of a dataset associated with a machine learning process and feature data that specifies an input feature of the machine learning process. The at least one processor is further configured to execute the instructions to access at least a portion of the dataset based on the received identifier, and obtain, from the accessed portion of the dataset, a feature vector associated with the machine learning process. Further, the at least one processor is configured to execute the instructions to generate a plurality of modified feature vectors based on the obtained feature vector. Each of the modified feature vectors includes a modified feature value of the specified input feature. Based on an application of the machine learning process to the obtained and modified feature vectors, the at least one processor is further configured to execute the instructions to generate and transmit, to the device via the communications interface, first explainability data associated with the specified input feature. The device is configured to execute an application program that presents a graphical representation of the first explainability data within a portion of a digital interface.

In other examples, a computer-implemented method includes receiving, using at least one processor, and from a device, an identifier of a dataset associated with a machine learning process and feature data that specifies an input feature of the machine learning process. The computer-implemented method also includes, using the at least one processor, accessing at least a portion of the dataset based on the received identifier and obtaining, from the accessed portion of the dataset, a feature vector associated with the machine learning process. The computer-implemented method includes generating, using the at least one processor, a plurality of modified feature vectors based on the obtained feature vector. Each of the modified feature vectors includes a modified feature value of the specified input feature. Based on an application of the machine learning process to the obtained and modified feature vectors, the computer-implemented method also includes, generating and transmitting, using the at least one processor, first explainability data associated with the specified input feature to the device. The device is configured to execute an application program that presents a graphical representation of the first explainability data within a portion of a digital interface.

Additionally, in some examples, an apparatus includes a memory storing instructions, a communications interface, and at least one processor coupled to the memory and the communications interface. The at least one processor is configured to execute the instructions to receive, from a device via the communications interface, an identifier of a dataset associated with a trained machine learning process and feature data that specifies an input feature of a machine learning process. The at least one processor is further configured to execute the instructions to access at least a portion of the dataset based on the received identifier and obtain, from the accessed portion of the dataset, a feature vector associated with the machine learning process. Further, the at least one processor is configured to execute the instructions to generate a plurality of modified feature vectors based on the obtained feature vector. Each of the modified feature vectors includes a modified feature value of the specified input feature. Based on an application of the trained machine learning process to the obtained and modified feature vectors, the at least one processor is further configured to execute the instructions to generate and transmit, to the device via the communications interface, monitoring data characterizing a performance or an operation of the trained machine learning model. The device is configured to execute an application program that presents a graphical representation of the monitoring data within a portion of a digital interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIGS. 2B and 2C are diagrams illustrating portions of an exemplary graphical user interface, in accordance with some exemplary embodiments.

Like reference numbers and designations in the various drawings indicate like elements.

DETAILED DESCRIPTION

Figure 1:
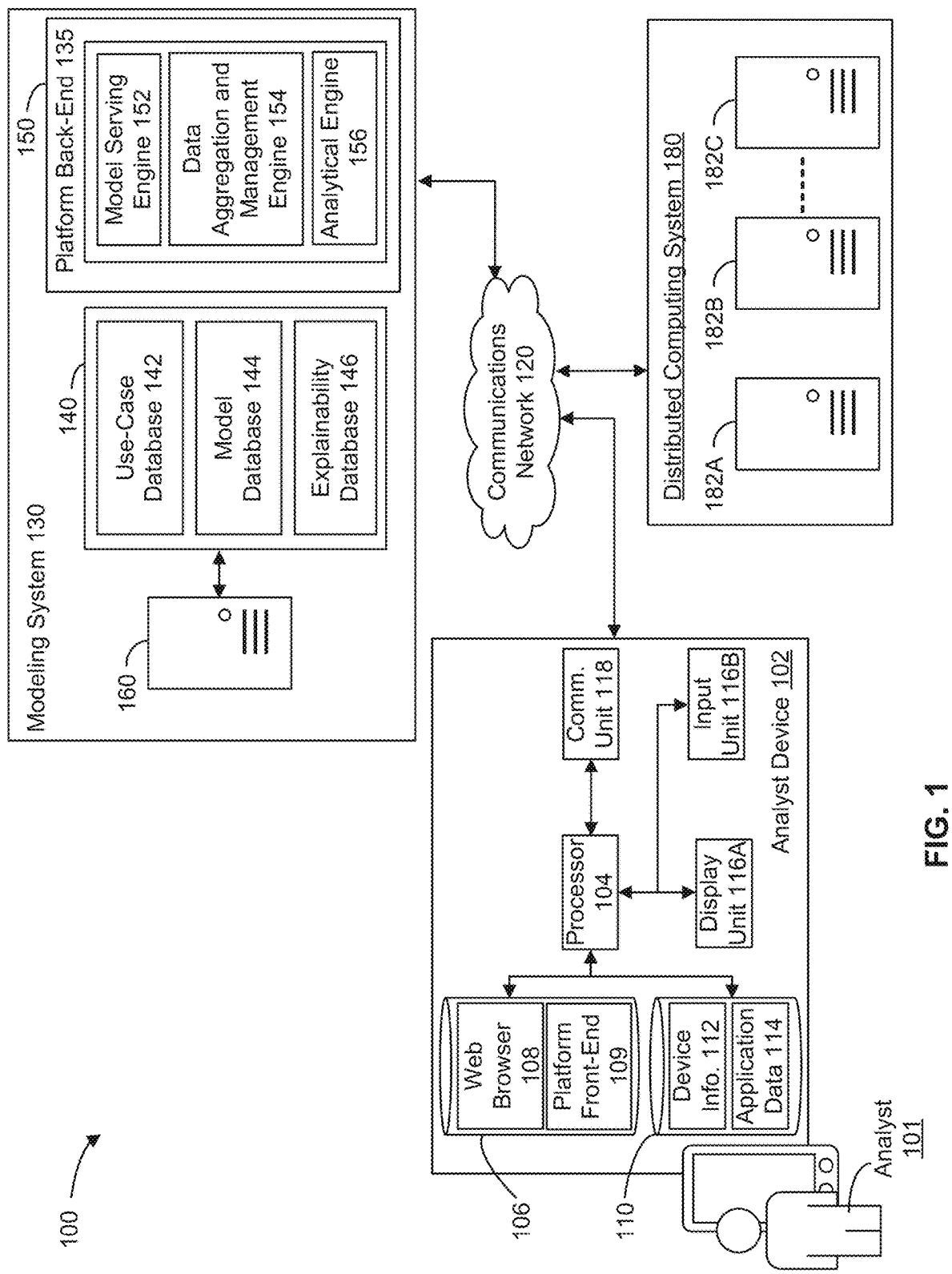
FIGS. 1 and 2A are block diagrams illustrating an exemplary computing environment, in accordance with some exemplary embodiments.

This specification relates to computer-implemented processes that, among other things, facilitates a flexible and dynamic analysis of a machine learning or artificial intelligence process, and a generation of analytical output that, when presented within a web-based graphical user interface (GUI) at computing system or device of an analyst, provides the analyst with insights on an operation of the machine learning or artificial intelligence process through an initial development and training period and further, through a subsequent deployment period. By way of example, and during an initial training or development period, certain of these exemplary processes may enable an analyst to inspect, via the web-based GUI, a behavior of a machine learning or artificial intelligence process through an application of one or more deterministic explainability algorithms to segmented portions of an input dataset ingested by the machine learning or artificial intelligence process, and values of various metrics that characterize a fairness or a performance of the machine learning or artificial intelligence process. Further, and subsequent to the deployment of a trained machine learning or artificial intelligence process, certain of the exemplary processes described herein may enable the analyst to visualize, via the web-based GUI, data characterizing input features and prediction stability of the trained machine learning or artificial intelligence process and further, to monitor and visualize, via the web-based GUI, evaluation metrics as ground truth data becomes available.

Today, machine learning and artificial intelligence processes are widely adopted throughout many industries, such as the financial services industry, and outputs of these machine learning models informs not only decisions related to a targeting marketing of financial products and services to customers, but also a determination of a credit or insolvency risk associated with these customers or a suspiciousness of certain actions taken by these customers. Many machine learning models, however, operate as "black boxes," and lack transparency regarding the importance and relative impact of certain input features, or combinations of certain input features, on the operations of these machine learning and artificial intelligence processes and on their predicted output. The lack of transparency and opacity that characterize many machine learning and artificial intelligence processes may also mask any implicit biases imprinted during development and/or training. Further, in some instances, the lack of transparency and opacity may limit an ability of a financial institution to not only inspect and characterize a behavior of a machine learning or artificial intelligence process during an initial training and development period, but also to monitor input features, prediction stability, and evaluation metrics during a post-training deployment period.

Although certain computer-implemented explainability tools exist to inspect a marginal effect of individual input features on an output of a machine learning or artificial intelligence process, and to characterize a contribution of certain features to the predicted output, many of these explainability tools are limited in their ability to inspect or characterize the marginal impact, or contribution, of large numbers of candidate features in a computationally efficient manner, especially when processing the large input datasets available to computing systems operated by financial institutions, e.g., via cloud-based storage. Indeed, many of these explainability tools are incapable of segmenting or downsampling an input dataset prior to analyzing the machine learning machine model, and as such, not only require significant computational resources when analyzing each of a potentially large number of features, but are also unable to characterize a fairness of the machine learning model when applied to segmented portions of the input dataset.

Further, many computer-implemented explainability tools are associated with model-specific implementations and configurations, and further, with manual, model-specific intervention to initiate the analysis of a machine learning or artificial intelligence process and the generation of static, analytical output tied to that manual intervention. These tools often lack any exposable, programmatic interface capable of interaction across multiple types of classes of machine learning or artificial intelligence process in various stages of development, training, or deployment, and lack any graphical user interface or digital portal that enables an analyst to flexibly, and dynamically, target certain candidate features, for inspection and analysis, and to view the analytical output of the inspection and analysis in real-time across multiple computing systems or devices.

Certain of the exemplary processes described herein, which facilitate a flexible and dynamic analysis of a machine learning or artificial intelligence process, and a generation of analytical output that, when presented within a web-based graphical user interface (GUI) at a computing system or a computing device, provides insights on an operation of an otherwise opaque machine learning or artificial intelligence process, may be implemented in addition to, or as an alternate to, one or more existing tools that are associated with input datasets having a static composition of structure, that are associated with model-specific implementations and configurations, and further, that are associated with manual, model-specific interventions to initiate the analysis of a machine learning or artificial intelligence process and the generation of static, analytical output tied to the manual intervention.

I. Exemplary Computing Environments

FIG. 1 is a diagram illustrating an exemplary computing environment 100 that includes, among other things, one or more computing devices, such as an analyst device 102, one or more computing systems, such as a modelling system 130, and a distributed computing system 180, which includes, but is not limited to, distributed components 182A, 182B, and 182C. In some instances, analyst device 102, modelling system 130, and distributed computing system 180, including distributed components 182A, 182B, and 182C, may be operatively connected to, and interconnected across, communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Analyst device 102 may include a computing device having one or more tangible, non-transitory memories, such as storage device 106, that store data and software instructions, and one or more processors coupled to the tangible, non-transitory memories, such as processor 104 coupled to storage device 106, configured to execute the software instructions. For example, storage device 106 may maintain one or more application programs, application modules, and other elements of code executable by the one or more processors, such as, but not limited to, an executable web browser 108 (e.g., Google Chrome™, Apple Safari™, etc.). Further, storage device 106 may also maintain one or more application widgets or plug-ins that upon execution by processor 104, interact and exchange data programmatically with one or more executed application programs, such as executed web browser 108.

For example, as illustrated in FIG. 1, storage device 106 may maintain a platform front-end 109 associated with an exemplary, computer-implemented analytical platform described herein, which facilitates a dynamic, and real-time analysis and monitoring of an operation of a machine learning or artificial intelligence process during a both an initial training and development and during subsequent deployment. In some instances, as described herein, executed platform front-end 109 may, in conjunction with executed web browser 108, perform operations to establish a secure, programmatic channel of communications across network 120 with modelling system 130, e.g., via an HTML-based application programming interface (API), with modelling system 130.

Further, and through a performance of any of the exemplary processes described herein, executed platform front-end 109 may, in conjunction with executed web browser 108 may generate and render for presentation one or more browser-based graphical user interfaces (GUIs) that enable a user, such as analyst 101, to interact with one or more of the exemplary computer-implemented analytical platforms described herein and inspect, in real time, a behavior of a selected machine learning or artificial intelligence process during an initial training and development period and further, during a subsequent deployment period. The disclosed embodiments, however, are not limited to these exemplary application programs, and in other examples, storage device 106 may include any additional or alternate application programs, application modules, or other elements of code executable by analyst device 102.

Analyst device 102 may also establish and maintain, within the one or more tangible, non-transitory memories, one or more structured or unstructured data repositories or databases. For example, data repository 110 may include device data 112 and application data 114. Device data 112 may include information that uniquely identifies analyst device 102, such as a media access control (MAC) address of analyst device 102 or an Internet Protocol (IP) address assigned to analyst device 102. Application data 114 may include information that facilitates, or supports, an execution of any of the application programs described herein, such as, but limited to, supporting information that enables executable platform front-end 109 to authenticate an identity of a user associated with analyst device 102, such as analyst 101. Examples of this supporting information include, but are not limited to, one or more alphanumeric login or authentication credentials assigned to analyst 101, for example, by modelling system 130, or one or more biometric credentials of analyst 101, such as fingerprint data or a digital image of a portion of analyst 101's face, or other information facilitating a biometric or multi-factor authentication of analyst 101.

Additionally, in some examples, analyst device 102 may include a display unit 116A configured to present interface elements to analyst 101, and an input unit 116B configured to receive input from a user of analyst device 102, such as analyst 101. For example, analyst 101 may provide input in response to interface elements presented through display unit 116A. By way of example, display unit 116A may include, but is not limited to, an LCD, LED, or OLED display unit or other appropriate type of display unit, and input unit 116B may include, but is not limited to, a keypad, keyboard, touchscreen, fingerprint scanner, voice activated control technologies, stylus, or any other appropriate type of input unit.

Further, in some examples, the functionalities of display unit 116A and input unit 116B may be combined into a single device, such as a pressure-sensitive touchscreen display unit that may present interface elements (e.g., graphical user interface) and may detect an input from analyst 101 via a physical touch. Analyst device 102 may also include a communications unit 118, such as a wireless transceiver device, coupled to processor 104. Communications unit 118 may be configured by processor 104, and may establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of analyst device 102 may include, but are not limited to, a personal computer, a laptop computer, a tablet computer, a notebook computer, a hand-held computer, a personal digital assistant, a portable navigation device, a mobile phone, a smartphone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on a corresponding display or interface unit. In some instances, analyst device 102 may also establish communications with one or more additional computing systems or devices operating within environment 100 across a wired or wireless communications channel, e.g., via the communications unit 118 using any appropriate communications protocol Referring back to FIG. 1, modelling system 130 may represent a computing system that includes one or more servers, such as server 160, and one or more tangible, non-transitory memory devices storing executable code or application modules. Further, each of the one or more servers, such as server 160, may include one or more processors, which may be configured to execute portions of the stored code or application modules to perform operations consistent with the disclosed embodiments. Modelling system 130 may also include one or more communications units or interfaces, such as one or more wireless transceivers, coupled to the one or more processors for accommodating wired or wireless internet communication across network 120 with other computing systems and devices operating within environment 100. In some instances, modelling system 130 may correspond to a discrete computing system, although in other instances, modelling system 130 may correspond to a distributed computing system having multiple computing components distributed across an appropriate computing network, such as communications network 120 of FIG. 1A, or those established and maintained by one or more cloud-based providers, such as Microsoft Azure™, Amazon Web Services™, or another third-party provider For example, and as illustrated in FIG. 1, modelling system 130 may maintain, within the one or more tangible, non-transitory memories, one or more data repositories, such as data repository 140, and one or more executable application programs 150 that include, among other things, executable platform back-end 135. In some instances, elements of data maintained within data repository 140, including elements of a use-case database 142, a model database 144, and an explainability database 146 described herein, may be accessible to the one or more processors of server 160 via a corresponding, executed read or write operations performed on portions of the one or more tangible, non-transitory memories of modelling system 130. Further, through an execution of platform-back end 135 by the one or more processors of server 160, modelling system 130 may, in conjunction with analyst device 102 (e.g., via executed platform front-end 109) and one or more of distributed components 182A 182B, and 182C, perform any of the exemplary processes described herein to establish a computer-implemented, web-based analytical platform that facilitates a flexible and dynamic analysis of an operation of a machine learning or artificial intelligence process across multiple analytical periods.

Referring back to FIG. 1, distributed computing system 180 may correspond to a distributed or cloud-based computing cluster that includes a plurality of interconnected, distributed components, such as, but not limited to distributed components 182A, 182B, and 182C. Each of distributed components 182A, 182B, and 182C may represent a computing system or computing device that includes one or more tangible, non-transitory memory devices storing executable code or application modules, and one or more processors, such as the CPUs described herein, configured to execute portions of the stored code or application modules to perform operations consistent with the disclosed embodiments. For example, and through the execution of the stored code or application modules, each of the distributed components 182A, 182B, and 182C may perform any of the exemplary processes described herein to apply one or more machine learning or artificial intelligence processes to feature vectors provisioned programmatically by modelling system 130, e.g., via a corresponding remote procedure call executed by modelling system 130, and to route, to modelling system 130, elements of predicted output data generated through the application of the machine learning or artificial intelligence process to respective ones of the input features vectors. Each of the distributed components 182A, 182B, and 182C may also include one or more communications units or interfaces, such as one or more wireless transceivers, coupled to the one or more processors for accommodating wired or wireless internet communication across network 120 with other computing systems and devices operating within environment 100.

Further, and in addition to the CPUs described herein, which process single, scalar operations in a single clock cycle, one or more of the distributed components of distributed computing system 180, such as distributed components 182A, 182B, or 182C, may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Distributed components 182A, 182B, and 182C, and other distributed components of distributed computing system 180, may also be configured to implemented one or more parallelized, fault-tolerant distributed computing and analytical processes, such as those processes provisioned by the Apache Spark™ distributed, cluster-computing framework or the Databricks™ analytical platform. Through an implementation of the parallelized, fault-tolerant distributed computing and analytical protocols described herein, the distributed components of distributed computing system 180, such as distributed components 182A, 182B, and 182C, may perform any of the exemplary processes described herein in parallel to apply one or more machine learning or artificial intelligence processes to the input features vectors provisioned by modelling system 130, e.g., during an initial training and development phase or during a subsequent deployment period.

In some exemplary embodiments, analyst device 102, modelling system 130 and one or more of the distributed components of distributed computing system 180, such as distributed components 182A, 182B, and 182C, may perform any of the exemplary processes described herein to establish, maintain, and operate a computer-implemented, web-based analytical platform that facilitates a flexible and dynamic analysis of a machine learning or artificial intelligence process, and a generation of analytical output that, when presented within a web-based graphical user interface (GUI) at analyst device 102, provides analyst 101 with insights on an operation of the machine learning or artificial intelligence process through an initial development and training period and further, through a subsequent deployment period. By way of example, and during an initial training or development period, certain of these exemplary processes may enable analyst 101 to inspect, via the web-based GUI presented at analyst device 102, a behavior machine of the learning or artificial intelligence process through an application of one or more deterministic explainability algorithms to segmented portions of an input dataset ingested by the machine learning or artificial intelligence process.

Further, during an initial training or development period, certain of these exemplary processes may also enable analyst 101 to visualize, via the web-based GUI presented at analyst device 102, data characterizing selected features and corresponding predictive output, and various fairness metrics for specified segments of the input dataset. Further, and subsequent to the deployment of a trained machine learning or artificial intelligence process, certain of the exemplary processes described herein may enable analyst 101 to visualize, via the web-based GUI presented at analyst device 102, data characterizing input features and prediction stability of the trained machine learning or artificial intelligence process and further, to monitor and visualize, via the web-based GUI presented at analyst device 102, evaluation metrics as ground truth data becomes available to the computer-implemented analytical platform.

For example, and as described herein, modelling system 130 may, through an execution of one or more of application programs 150 by the server 160, perform operations that provision platform front-end 109 to one or more computing systems or devices operating within environment 100, such as analyst device 102. Upon provisioning to analyst device 102 and storage within storage device 106, analyst 101 may provide input to analyst device 102 (e.g., via input unit 116B) that causes processor 104 of analyst device 102 to execute web browser 108. Further, based on additional input provided to analyst device 102, analyst 101 may access a web page or other digital interface associated with the web-based analytical platform, and executed web browser 108 may, in conjunction with platform front-end 109 (e.g., executed via one or more programmatic commands generated by executed web browser 108) initiate one or more authentication processes to authenticate an identity of analyst 101, such as, but not limited to, a multifactor authentication process based on authentication credentials maintained within application data 114.

In some examples, and based on a successful authentication of analyst 101, executed platform front-end 109 may perform any of the exemplary processes to establish a secure, programmatic channel of communications across network 120 with modelling system 130, and in conjunction with executed web browser 108, may present one or more portions of a digital interface associated with the web-based analytical platform (e.g., portions of the web page described herein), which may prompt analyst 101 to select, among other things, a particular machine learning or artificial intelligence process for inspection, analysis, or monitoring and a corresponding analytical period.

The digital interface may also prompt analyst 101 to select an input dataset suitable for ingestion by the selected machine learning or artificial intelligence process (e.g., as maintained in data repositories accessible to modelling system 130), and in some instances, to specify a particular segment (e.g., a subset) of the input dataset for ingestion by the machine learning or artificial intelligence process during the analytical period or a sample size for that selected segment. Further, digital interface may also prompt analyst 101 to select, among other things, one or more features of the machine learning or artificial intelligence process subject to explainability analysis using any of the exemplary processes described herein, ranges of feature values associated with each of the features (e.g., minima or maxima, etc.), and a number of interpolation points for the explainability analyses described herein. The disclosed embodiments are, however, not limited to these examples of analyst input, and in other examples, the one or more portions of the digital interface may prompt analyst 101 to specify any additional, or alternate, data that facilitates the exemplary analytical and monitoring processes described herein.

In some examples, analyst device 102 may receive the analyst input to the presented portions of the digital interface, and executed platform front-end 109 may perform operations that cause analyst device 102 to transmit all, or a selected portion, of the analyst input to modelling system 130, e.g., across the secure, programmatic channel of communications. Modelling system 130 may receive the portions of the analyst input (e.g., via an HTTP-based programmatic interface), and based on the portions of the analyst input, modelling system 130 may perform any of the exemplary processes described herein to access at least a portion of the analyst-specified input dataset, and based on segmentation data specified by analyst 101 (e.g., within a portion of the analyst input), to identify the analyst-specified subset of the input dataset.

Further, modelling system 130 may also perform operations, described herein, to process the accessed potions of the input dataset, or the analyst-specified subset of the input dataset, and generate a downsampled input dataset consistent with the analyst-specified sample size. Based on the downsampled input dataset, modelling system 130 may generate one or more feature vectors corresponding to, and based on, the downsampled input dataset. In some instances, the one or more feature vectors may include values of one or more features (e.g., features values), and a composition, and a structure, of the feature values within the one or more feature vectors may be consistent with the selected machine learning or artificial intelligence process. For example, the feature values of the one or more feature vectors may be extracted from the downsampled input dataset, or may be derived from the downsampled input dataset, as described herein.

In some instances, modelling system 130 may also perform any of the exemplary processes that, based on the one or more feature vectors, generate a plurality of modified feature vectors in accordance with portions of the analyst-specified input data. By way of example, and as described herein, the analyst-specified input data may specify one or more features for the exemplary explainability analyses described herein, and for each of the one or more features, may further specify a range of feature values (e.g., a maximum and a minimum value, etc.), and a number of interpolation points for that feature value range. In some instances, and for each of the specified features, modelling system 130 may perform any of the exemplary processes described to discretize the corresponding feature range into discrete intervals consistent with specified number of interpolation points, and to determine, for each of the discrete intervals, a discretized feature value. By way of example, and as described herein, the discretized feature values may vary linearly across the discretized intervals of the feature range, or in accordance with any additional, or alternate non-linear or linear function.

By way of example, and as described herein, modelling system 130 may perform operations that package the discretized feature values into a corresponding set of discretized feature values for each of the specified features, and that compute, for each of the specified feature values, a plurality of modified feature vectors based on a perturbation of the one or more extracted feature vectors based on the corresponding set of discretized feature values. By way of example, and for corresponding feature vector and analyst-specified feature, modelling system 130 may perform any of the exemplary processes described herein to identify, within the corresponding feature vector, the feature value associated with the analyst-specific feature, and to generate corresponding ones of the modified feature vectors by replacing that feature value with a corresponding one of the set of discretized feature values for the analyst-specified feature.

Further, and using any of the exemplary processes described herein, modelling system 130 may apply the selected machine learning or artificial intelligence process to each of the one or more extracted feature vectors and to each of plurality of modified feature vectors. Based on elements of predictive data output by the applied machine learning or artificial intelligence process, modelling system 130 may perform any of the exemplary processes described herein to generate one or more elements of explainability data that characterize, among other things, a marginal effect of a perturbation in a value of each of the analyst-specified features on an outcome of the selected machine learning or artificial intelligence process, and a contribution of each of the analyst-specified features to the outcome of the selected machine learning or artificial intelligence process.

In some examples, the one or more servers of modelling system 130, such as server 160, may perform operations that apply the selected machine learning or artificial intelligence process to each of the extracted and modified feature vectors, and based on the application of the selected machine learning or artificial intelligence process to the extracted and modified feature vectors, generate the corresponding elements of predictive output data. In other examples, as described herein, modelling system 130 may perform operations that execute one or more remote procedure calls to the distributed components of distributed computing system 180, such as distributed components 182A, 182B, and 182C, and that provision, via programmatically established instances of an executed modelling service, one or more of the extracted and modified feature vectors to these distributed components via a corresponding programmatic interface. Each of the distributed components of distributed computing system 180, including distributed components 182A, 182B, and 182C, may perform operations that apply the selected machine learning or artificial intelligence process to subsets of the extracted or modified feature vectors, and that transmit corresponding elements of predicted output data to respective ones of the programmatically established instances of the executed modelling services.

As described herein, the explainability data may include, but is not limited to, data characterizing one or more partial dependency plots associated with the analyst-specified features, or one or more metrics indicative of a contribution of these analyst-specified features to the predictive outcome of the selected machine learning or artificial intelligence process, such as one or more Shapley feature value contributions. Further, modelling system 130 may transmit all, or selected portions of, the explainability data to analyst device 102, and as described herein, executed platform front-end 109 may perform operations that, in conjunction with executed web browser 108, present a graphical representation of the explainability data within a portion of the digital interface associated with the web-based analytical platform (e.g., via display unit 116A).

Further, and based on elements of predictive data output by the selected machine learning or artificial intelligence process, modelling system 130 may perform additional of the exemplary processes described herein to generate one or more elements of fairness data and additionally, or alternatively, one or more elements of performance data, associated with the selected machine learning or artificial intelligence process. The elements of fairness data may include, among other things elements of comparative data, and values of one or more fairness metrics that, for example, identify and characterize any implicit biases (e.g., between particular demographic groups, etc.) associated with the development or training of the selected machine learning or artificial intelligence process. Further, the elements of performance data may include, among things, values of one or more metrics that characterize a performance or operation of the selected machine learning or artificial intelligence process. Modelling system 130 may transmit all, or selected portions of, the fairness data or the performance data to analyst device 102, and as described herein, executed platform front-end 109 may perform operations that, in conjunction with executed web browser 108, present a graphical representation of the fairness data or the performance data within a portion of the digital interface associated with the web-based analytical platform (e.g., via display unit 116A).

In some instances, modelling system 130 may, in conjunction with analyst device 102 and distributed computing system 180, perform any of the processes described herein to analyze the explainability, fairness, or performance of the selected machine learning or artificial intelligence process during an initial training or development phase. In other instances, consistent with the disclosed exemplary embodiments, the selected machine learning or artificial intelligence process may correspond to a trained machine learning or artificial intelligence process, and modelling system 130 may, in conjunction with analyst device 102 and distributed computing system 180, perform any of the exemplary processes described herein to apply the trained machine learning or artificial intelligence processes to the extracted and modified feature vectors, and to generate one or more elements of monitoring data that characterizes a performance or operation of the trained machine learning or artificial intelligence process, e.g., during a post-training deployment period. Modelling system 130 may transmit all, or selected portions of the monitoring data to analyst device 102, and as described herein, executed platform front-end 109 may perform operations that, in conjunction with executed web browser 108, present a graphical representation of the fairness data or the performance data within a portion of the digital interface associated with the web-based analytical platform.

To facilitate a performance of these exemplary processes, modelling system 130 may maintain, within data repository 140, use-case database 142, model database 144, and explainability database 146. Use-case database 142 may, for example, include elements of use case-data that characterize input datasets and a composition of feature vectors or one or more of machine learning or artificial intelligence processes available for analysis (and selection by analyst 101) using any of the exemplary processes described herein, during both a training and development phase and during a deployment period.

Further, the elements of use case-data may also include prior inferences, elements of predicted output data, and in some instances, data characterizing ground truths associated with these prior inferences and predicted output data, for one or more trained machine learning or artificial intelligence processes available for analysis (and selection by analyst 101) using any of the exemplary processes described herein during a deployment or validation phase. By way of example, the data characterizing the ground truths may be generated by modelling system 130 based on application of a trained machine learning or artificial intelligence process to obtained and modified feature vectors during a validation period. In some examples, use-case database 142 further stores elements of metadata, logs of instances of executed modelling services, and settings, and may further provide data cache for the analytical platform described herein.

Model database 144 may include data identifying and characterizing one or more machine learning or artificial intelligence processes available for analysis (and selection by analyst 101). Examples of the available machine learning or artificial intelligence processes may include, but are not limited to, one or more decision-tree models, one or more gradient-boosted decision-tree models, one or more neural network models, or one or more supervised- or unsupervised-learning models. For instance, and for one or more of the available machine learning or artificial intelligence processes, model database may include, among other things, one or more model coefficients, model parameters, or model thresholds that characterize the available machine learning or artificial intelligence processes, and enable modelling system 130, or one or more of the distributed components of distributed computing system 180, to apply the available machine learning or artificial intelligence processes to elements of obtained or modified feature vectors, including a composition or structure of a corresponding input feature vector.

Explainability database 146 may store elements of explainability data, such as one or more of the elements of explainability data generated by modelling system 130. The explainability data may include data that characterizes an analysis of the operation or performance of one or more of the machine learning or artificial intelligence processes. For example, the explainability data may include data that characterizes a partial dependency plot associated with an analyst-specified input feature and additionally, or alternatively, data that characterizes a Shapley value feature contribution of the analyst-specified input feature. Explainability database 146 may further include elements of analytical data, which may characterize the behavior of a machine learning model both during initial development and subsequent to deployment. Explainability database 146 may also include elements of fairness data, performance, or monitoring data associated with and characterizing the one or more of the machine learning or artificial intelligence processes, such as, but not limited to, the elements of fairness data, performance, or monitoring data described herein.

Further, and to facilitate a performance of these exemplary processes, modelling system 130 may also maintain, within the one or more tangible, non-transitory memories, one or more executable application programs 150, such as, but not limited to, platform back-end 135, which may include a model serving engine 152, a data aggregation and management engine 154, and an analytical engine 156. Modelling system 130 may execute (e.g., via server 160), any of the one or more executable application programs 150. Platform back-end 135 may correspond to a component of the exemplary, computer-implemented and web-based analytical platform described herein, and may be in communication with the platform front-end 109 (e.g., executed at analyst device 102) via secure, programmatic channel of communications established with analyst device 102 across network 120. For example, upon execution, platform back-end 135 may establish and maintain a programmatic interface, such as an HTML-based application programming interface (API), which may be consumed by executed platform front-end 109.

Upon execution by modelling system 130, model serving engine 152 may perform any of the operations described herein to generate elements of use-case data, and to provision (e.g., "serve") the generated elements of use-case data to data aggregation and management engine 154 executed by modelling system 130. For example, model serving engine 152 may generate one or more of the elements of use-case data, such as input datasets and the feature vectors, based on corresponding elements of confidential customer data maintained at modelling system 130 within one or more locally accessible data repositories. Examples of the confidential customer data may include, but are not limited to, elements of customer profile data identifying and characterizing one or more customers of the financial institution, account data characterizing one or more financial instruments, products, or accounts held by these customers, transaction data identifying and characterizing one or more transaction involving the financial instruments, products, or accounts, or reporting data identifying or characterizing these customers, such as a credit score for one or more of the customers generated by a corresponding reporting entity.

Further, and upon execution by modelling system 130, data aggregation and management engine 154 may perform any of the exemplary processes described herein to ingest each of the generated elements of use-case data (e.g., input datasets, feature vectors, or other information characterizing one or more use-cases of a selected machine learning or artificial intelligence process), and to select, for one or more of the use cases, select a subset of the input dataset for query and analysis using any of the exemplary processes described herein. In some examples, executed data aggregation and management engine 154 may also perform random downsampling to further reduce the magnitude of input dataset, while maintaining a statistical character of that input dataset, e.g., in accordance with an analyst-specified sample size. Executed data aggregation and management engine 154 may also perform operations that maintain, within a data repository (e.g., use-case database 142), data identifying inferences and outputs generated or predicted through an application of one or more machine learning or artificial intelligence processes to corresponding input datasets using any of the exemplary processes described herein, along with ground truths for subsequent validation, elements of metadata, logs of programmatically established instances of executed modelling service (e.g., that generate remote procedure calls to the distributed components of distributed computing system 180, etc.), settings for the exemplary, computer-implemented and web-based analytical platform.

In some instances, and upon execution by modelling system 130, analytical engine 156 may perform any of the operations described herein to generate elements of analytical data that, upon visualization by analyst 101) at analyst device 102, enables analyst 101 to inspect a behavior of a selected machine learning or artificial intelligence process, both during an initial training and development period, and during a subsequent deployment period. The analytical data may include, but is not limited to, one or more elements of the exemplary explainability data, fairness data, performance data, or monitoring data described herein, along with additional elements of data that characterize an operation or a performance of a selected machine learning or artificial intelligence process.

For example, executed analytical engine 156 may perform any of the exemplary processes described herein to apply one or more explainability algorithms to elements of data characterizing a predicted output of the selected machine learning or artificial intelligence process. Based on the application of the one or more explainability algorithms described herein, executed analytical engine 156 may generate partial dependence data establishing a partial dependence plot that characterizes a marginal impact of an analyst-specified feature on the predicted output, and may generate contribution data that characterizes a contribution of a feature to the predicted output of the selected machine learning or artificial intelligence process, e.g., one or more Shapley value feature contributions. Executed analytical engine 156 may further store all, or a selected portion of, the analytical data within one or more locally accessible data repositories, such as explainability database 146.

Executed analytical engine 156 may also perform any of the exemplary processes described herein that, during an initial training or development period, or during a subsequent deployment period, generate data supporting common visualizations of input features and predicted output of a selected machine learning or artificial intelligence process (e.g., a prediction distribution, values of evaluation metrics, feature histograms and correlation matrices, etc.), as well as fairness data supporting an evaluation of the underlying fairness of the selected machine learning or artificial intelligence process. Examples of the fairness data may include, but are not limited to, data comparing the prediction distribution, evaluation metrics, and feature distributions associated with various segments of an input dataset, and values of one of more metrics (e.g., "fairness" metrics) appropriate to the selected machine learning or artificial intelligence process, and executed analytical engine 156 may store the elements of fairness data within the one or more locally accessible data repositories, e.g., explainability database 146.

In some instances, executed analytical engine 156 may implement a fairness analysis of the selected machine learning or artificial intelligence process based on an ingestion of a downsampled input dataset (or downsampled segment of an input dataset). Through the implemented fairness analysis, and based on the application of the selected machine learning or artificial intelligence process to the downsampled input dataset or downsampled segment, executed analytical engine 156 may generate one or more elements comparative data, which reflect comparison of a prediction distribution, evaluation metrics, or feature distributions of the selected machine learning or artificial intelligence process across specified populations within the downsampled input dataset or downsampled segment, e.g., that exhibit certain demographic characteristics. Based on the generated elements of comparative data, executed analytical engine 156 may perform any of the exemplary processes described to compute the values of the fairness metrics for the selected machine learning or artificial intelligence process, which may identify and characterize any implicit biases (e.g., between particular demographic groups, etc.) associated with the selected machine learning or artificial intelligence process. These implicit biases may, for example, be introduced either through the selection of the input datasets, features, or feature vectors for the selected machine learning or artificial intelligence process, or by the developers through the training of the selected machine learning or artificial intelligence process.

Executed analytical engine 156 may also perform any of the exemplary processes described herein to compute, during the fairness analysis, values of one or more evaluation metrics for the selected machine learning or artificial intelligence process based on, and in accordance with, one or more analytical models (e.g., to characterize a performance or an operation of the selected machine learning or artificial intelligence process). For example, executed analytical engine 156 may perform operations that select the one or more analytical models for application to the selected machine learning or artificial intelligence process based on, among other things, certain contextual characteristics of the input dataset, corresponding downsampling and segmentation processing, and the analytical period.

By way of example, and consistent with a first one of the analytical models, executed analytical engine 156 may perform operations that compute the evaluation metrics based on a full, input dataset selected by analyst 101. In some instances, the computation of the evaluation metrics using the first analytical model may be characterized by a significant computational time (and a significant consumption of computational resources at modelling system 130), and executed analytical engine 156 may apply the first analytical model to the full, analyst-selected input dataset to compute the evaluation metrics offline while monitoring a performance of a trained machine learning or artificial intelligence process, e.g., during a deployment period using any of the exemplary processes described herein. For example, evaluation metrics computed by executed analytical engine 156 in accordance with the first analytical model may be provisioned to analyst device 102 for presentation on one or more monitoring screens of the digital interface established by executed web browser 108 in conjunction with executed platform front-end 109, e.g., to illustrate temporal changes in the evaluation metrics during the deployment period.

In other examples, and consistent with a second one of the analytical models, executed analytical engine 156 may perform operations that compute the evaluation metrics based on a downsampled input dataset (or downsampled segment of an input dataset) derived from the full, input dataset selected by analyst 101. For instance, executed analytical engine 156 may apply the second analytical model to the downsampled input dataset or downsampled segment, and may perform any of the exemplary processes described herein to generate data characterizing one or more partial dependency plots or feature value contributions. Further, in some instances, evaluation metrics computed by executed analytical engine 156 in accordance with the second analytical model may be provisioned to analyst device 102 for presentation, on one or more portions of the digital interface, as supplementary information characterizing the analyst-selected input dataset or segment, e.g., in conjunction with the one or more partial dependency plots or feature value contributions.

Consistent with a third analytical model, executed analytical engine 156 may compute the evaluation metrics based on the full, analyst-specified input dataset, and may further exemplary processes consistent with the third analytical model that dispose or "bin" elements of the predicted output of the selected machine learning or artificial intelligence process into corresponding ventiles, and that compute the evaluation metrics based on a determination of a number of elements of predicted output within one or more of the ventiles that are associated with certain characteristics (e.g., "counting" positive samples within the ventiles). The disclosed embodiments are, however, not limited to these examples of analytical models, and in other instances, executed analytical engine 156 may compute one or more of the evaluation metrics in accordance with any additional, or alternate, analytical model appropriate to the selected machine learning or artificial intelligence process or the contextual characteristics of the input dataset, corresponding downsampling and segmentation processing, and the analytical period. In some instances, executed analytical engine 156 may store elements of fairness data characterizing an output of the fairness analysis, and any of the exemplary data elements and metric values described herein, within a portion of the locally accessible data repository, such as within explainability database 146.

Further, and subsequent to deployment of the selected machine learning or artificial intelligence process, executed analytical engine 156 may perform operations to generate additional elements of data (e.g., monitoring data) that facilitates a monitoring, by analyst 101, of an ongoing behavior of the selected machine learning or artificial intelligence process and the impact or contribution of the input features on the predicted output of that selected machine learning or artificial intelligence process. For example, the monitoring data may include data characterizing an impact or contribution of one or more input features on the predicted output of the selected machine learning or artificial intelligence process (e.g., feature contribution trends for "top" features, etc.), data characterizing a prediction stability of the machine learning model (e.g., average predictions, ground truths, population stability index (PSI) reports, etc.), or data characterizing one or more evaluation metrics or trends in the one or more evaluation metrics.

In some instances, executed analytical engine 156 may perform any of the exemplary processes described herein to operations to provision elements of the explainability, fairness, or summary data and additionally, or alternatively, elements of the monitoring data, to executed platform front-end 109 of analyst device 102, e.g., via the secure, programmatic channel of communications established between executed platform front-end 109 and modelling system 130. As described herein, executed platform front-end 109 may perform operations that, in conjunction with executed web browser 108, present a graphical representation of one or more of the elements of explainability, fairness, summary, or monitoring data within corresponding portions of the digital interface associated with modelling system 130 (e.g., within one or more web pages of the exemplary, computer-implemented and web-based analytical platform described herein). Through the visualization of the analytical or monitoring data at the analyst system or device, the analyst may inspect visually the behavior or fairness of the selected machine learning or artificial intelligence process, and interactively assess an impact of one or more features of the behavior or fairness.

II. Exemplary Computer-Implemented Analytical Platforms for Flexibly and Dynamically Analyzing Machine Learning and Artificial Intelligence Processes In some instances, analyst device 102, modelling system 130, and one or more of the distributed components of distributed computing system 180, such as distributed components 182A, 182B, and 182C, may perform any of the exemplary processes described herein to flexibly and dynamically analysis of a machine learning or artificial intelligence process during one or more analytical periods, and to generate elements of analytical input that characterize an explainability, a fairness, or a performance of that machine learning or artificial intelligence process during the one or more analytical periods. Further, and through a presentation of these elements of analytical data within a graphical user interface (GUI) at analyst device 102, the exemplary processes described herein may provide analyst 101 with insights on an operation of the machine learning or artificial intelligence process through not only initial development and training period, but also during a subsequent deployment period.

Figure 2A:
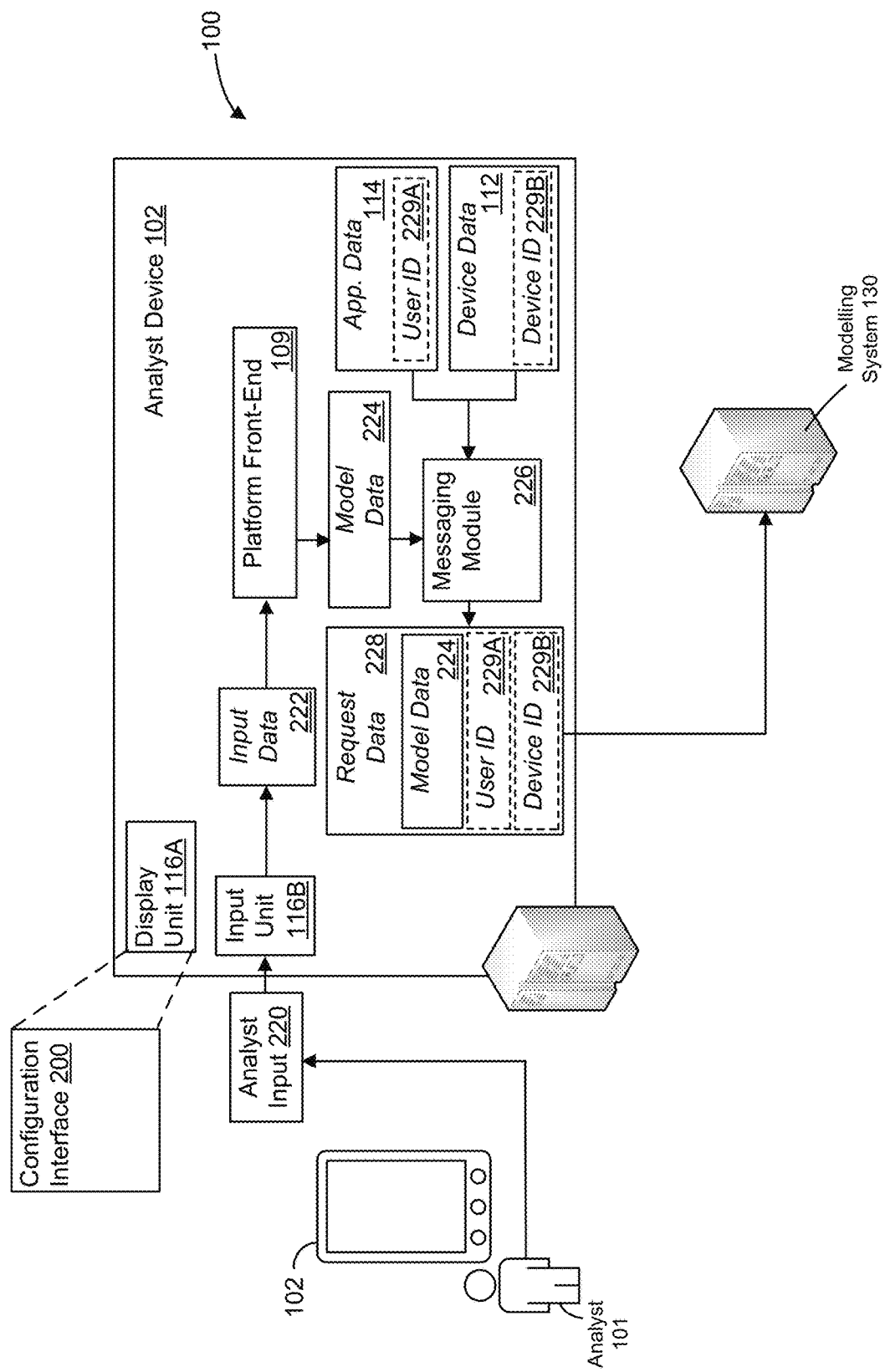

Referring to FIG. 2A, analyst 101 may provide input to analyst device 102 (e.g., via input unit 116B) that causes processor 104 to execute web browser 108. Further, analyst 101 may provide, via input device 116, additional input to analyst device 102 that requests access a web page or other digital interface associated with the web-based analytical platform, and executed web browser 108 may, in conjunction with platform front-end 109 (e.g., executed via one or more programmatic commands generated by executed web browser 108) initiate one or more authentication processes to authenticate an identity of analyst 101.

In some examples, and based on a successful authentication of the identity of analyst 101, executed platform front-end 109 may perform any of the exemplary processes to establish a secure, programmatic channel of communications across network 120 with modelling system 130. Further, platform front-end 109 (in conjunction with executed be browser 1908) may generate one or more interface elements that, when rendered for presentation by display unit 116A within a corresponding configuration interface 200, identify one or more machine learning or artificial intelligence processes that are available for analysis via the web-based analytical platform during a corresponding analytical period, such as an initial training or development period, or a subsequent deployment period. In some instances, analyst 101 may provide additional input to input unit 116B of analyst device 102 that selects one of a plurality of available machine learning or artificial intelligence processes, and further specifies the corresponding analytical period, e.g., the initial training or development period, or the subsequent deployment period.

Referring to FIG. 2B, configuration interface 200 includes interface portion 202, which includes interface elements that identify the plurality of available machine learning or artificial intelligence processes, and that prompt analyst 101 to select one of the available machine learning or artificial intelligence processes for analysis using the web-based analytical platform described herein. For example, interface portion 202 may include selectable icons 203A, 203B, and 203C associated with, and identifying, a respective one of a first available machine learning (ML) or artificial intelligence (AI) process, a second available ML or AI process, and a third available ML or AI process. As described, examples of the available machine learning or artificial intelligence processes may include, but are not limited to, one or more decision-tree models, one or more gradient-boosted decision-tree models, one or more neural network models, or one or more supervised- or unsupervised-learning models.

Configuration interface 200 may also include a second portion 204 that includes interface elements identifying each of the analytical periods and prompting analyst 101 to select one of the analytical periods for analysis using the web-based analytical platform described herein. For example, interface portion 204 may include selectable icon 205A associated with a first analytical period (e.g., a training or development period) and selectable icon 205B associated with a second analytical period (e.g., a subsequent deployment period).

In some instances (not illustrated in FIG. 2B), analyst 101 may provide input to analyst device 102 (e.g., via input unit 116B) that engages with and selects selectable icon 203A (e.g., indicative of a selection of the first available machine learning or artificial intelligence process, such as a gradient-boosted decision-tree model, for analysis using the web-based analytical platform described herein) and selectable icon 205A (e.g., indicative of the selection of the training or development period). Analyst 101 may also provide input to analyst device 102 that selects "Next" icon 213, which confirms the selection, by analyst 101, of the first available machine learning or artificial intelligence process for analysis using the web-based analytical platform during the training or development period.

Based on the selection of "Next" icon 213 by analyst 101, executed web browser 108 and executed platform front-end 109 may perform additional operations that generate, and render for presentation within configuration interface 200, additional interface elements that prompt analyst 101 to further configure an operation of the exemplary, web-based analytical platform during the selected training or development period, as illustrated in FIG. 2C. Alternatively, upon selection of "Cancel" icon 214 by analyst 101, executed platform front-end 109 may perform operations that delete any previously selected ones of the available machine learning or artificial intelligence processes or corresponding analytical periods.

Referring to FIG. 2C, configuration interface 200 may also include interface element 206, which prompts analyst 101 to select an input dataset available for ingestion by the selected machine learning or artificial intelligence process (e.g., the machine learning or artificial intelligence processes associated with selectable icon 203A of FIG. 2A). For example, interface element 206 may correspond to an interactive, pull-down menu that, when selected by analyst 101 via input provided to analyst device 102, causes executed web browser 108 and executed platform front-end 109 to present, for selection by analyst 101 within configuration interface 200, one or more input datasets available to or at modelling system 130 for ingestion by the selected machine learning or artificial intelligence process. In some instances, an availability of each of the one or more input datasets may depend on access permissions granted to analyst 101 by the financial institution, and additionally, or alternatively, on one or more characteristics of the selected machine learning or artificial intelligence process (e.g., a model type of the selected machine learning or artificial intelligence process, etc.).

Configuration interface 200 may also include interface element 208, which prompts analyst 101 to select a sample size associated with the application of the selected machine learning or artificial intelligence process to the input dataset. Interface element 208 may also correspond to an interactive, pull-down menu that, when selected by analyst 101 via input provided to analyst device 102, causes executed web browser 108 and executed platform front-end 109 to present, for selection by analyst 101 within configuration interface 200, a number of predetermined sample sizes. In some instances, the predetermined sample size may also include a random sample size that, when selected by analyst 101, enables modelling system 130 to randomly downsample the selected input dataset using any of the exemplary processes described herein.

Configuration interface 200 may also include one or more of interface elements 210, which may prompt analyst 101 to identify one or more input features of the selected machine learning or artificial intelligence process for analysis using any of the exemplary explainability processes described herein. Interface elements 210 may also prompt analyst 101 to specify, for each of the one or more selected input features, a corresponding range of feature values additionally, or alternatively, a number of interpolation points for the explainability analysis described herein. In some instances, one or more of interface elements 210 may include an interactive, pull-down menu or a fillable text box, which enable analyst 101 to provide input to analyst device 102 (e.g., via input unit 116B) that specifies the one or more input features, the corresponding ranges of feature values, and the corresponding number of interpolation points.

Further, configuration interface 200 may also include one or more of interface elements 212, which prompt analyst 101 to select a particular segment of the selected input dataset for analysis by the web-based analytical platform described herein. For example, interface elements 212 may allow analyst 101 to select the particular segment of the input dataset in accordance with particular types of input data (e.g., customer profile data, transaction data, account data, etc.), in accordance with temporal information characterizing the elements of the input dataset (e.g., dates on which modelling system 130 captured or obtained the elements of the input dataset), or by any other suitable segmentation of the input dataset, including a segment size (e.g., a number of elements within the segmented dataset). In some instances, one or more of interface elements 212 may include an interactive, pull-down menu or a fillable text box, which enable analyst 101 to provide input to analyst device 102 (e.g., via input unit 116B) that specifies the particular segment of the selected input dataset for analysis.

In some instances, and based on the selection of "Submit" icon 216 by analyst 101, executed platform front-end 109 may perform any of the exemplary processes described herein to package elements of analyst input specifying the selected machine learning or artificial intelligence process, the corresponding analytical period, the selected input dataset and the corresponding sample size, the one or more selected features, corresponding ranges of feature values, and/or corresponding number of interpolation points, and the selected segment of the input dataset into portions of message data, which analyst device 102 may transmit across network 20 to modelling system 130. Alternatively, upon selection of "Cancel" icon 214 by analyst 101, executed platform front-end 109 may perform operations that delete any previously selected one of the machine learning or artificial intelligence process, the corresponding analytical period, the one or more selected features, the corresponding ranges of feature values, and/or the number of interpolation points.

Referring back to FIG. 2A, input unit 116B of analyst device 102 may receive one or more elements of analyst input 220 to configuration interface 200, and input unit 116B may perform operations that route one or more corresponding elements of input data 222 to executed platform front-end 109. By way of example, and as described herein, the elements of input data 222 may include, but are not limited to: one or more identifiers of the machine learning or artificial intelligence process selected by analyst 101 (e.g., based on interaction with selectable icons 203A, 203B, or 203C of FIG. 2B); the analytical period selected by analyst 101 (e.g., based on interaction with selectable icons 205A or 205B of FIG. 2B); one or more identifiers of the input dataset selected by analyst 101 (e.g., based on interaction with interface element 206 of FIG. 2C); sampling data that includes the sample size specified by analyst 101 (e.g., based on interaction with interface element 208 of FIG. 2C); feature data characterizing the one or more features selected by analyst 101, the corresponding ranges of feature values specified by analyst 101, and/or the corresponding number of interpolation points (e.g., based on interaction with interface elements 210 of FIG. 2C); and segmentation data characterizing the particular segment of the selected input dataset specified by analyst 101 for analysis by the web-based analytical platform (e.g., based on interaction with interface elements 212 of FIG. 2C).

In some instances, executed platform front-end 109 may package all, or a selected subset, of the elements of input data 222 into corresponding portions of model data 224, which executed platform front-end 109 may provide as an input to a messaging module 226 executed by analyst device 102. Executed messaging module 226 may receive model data 224, and may perform operations that package model data 224 into portions of request data 228. Executed messaging module 226 may also perform operations that access application data 114 (e.g., as maintained within data repository 110) and extract user identifier 229A of analyst 101 (e.g., the alphanumeric login credential or biometric credential of analyst 101, etc.), and further, that access device data 112 (e.g., as also maintained within data repository 110) and extract device identifier 229B of analyst device 102 (e.g., a network address of analyst device 102, such as an IP address or a MAC address). In some instances, executed messaging module 226 may perform operations that package user identifier 229A and, in some instances, device identifier 229B, into corresponding portions of request data 228.

Executed messaging module 226 may also perform operations that cause analyst device 102 to transmit request data 228 across network 120 to modelling system 130. In some instances, and prior to transmission to modelling system 130, executed messaging module 226 may also perform operations that encrypt all, or a selected portion, of request data 228 using corresponding encryption key, such as a public cryptographic key associated with modelling system 130. As described herein in reference to FIGS. 3A and 3B, modelling system 130 may perform any of the exemplary processes described herein to access the analyst-specified input dataset, to generate a plurality of input feature vectors in accordance with the analyst-specified sample size, feature data, and segmentation data, and based on an application of the selected machine learning or artificial intelligence process to the input feature vectors, generate elements of explainability, fairness, performance, and/or monitoring data that enable analyst 101 to inspect a behavior or an operation of the selected machine learning or artificial intelligence process during the analyst-selected analytical period.

Figure 3A:
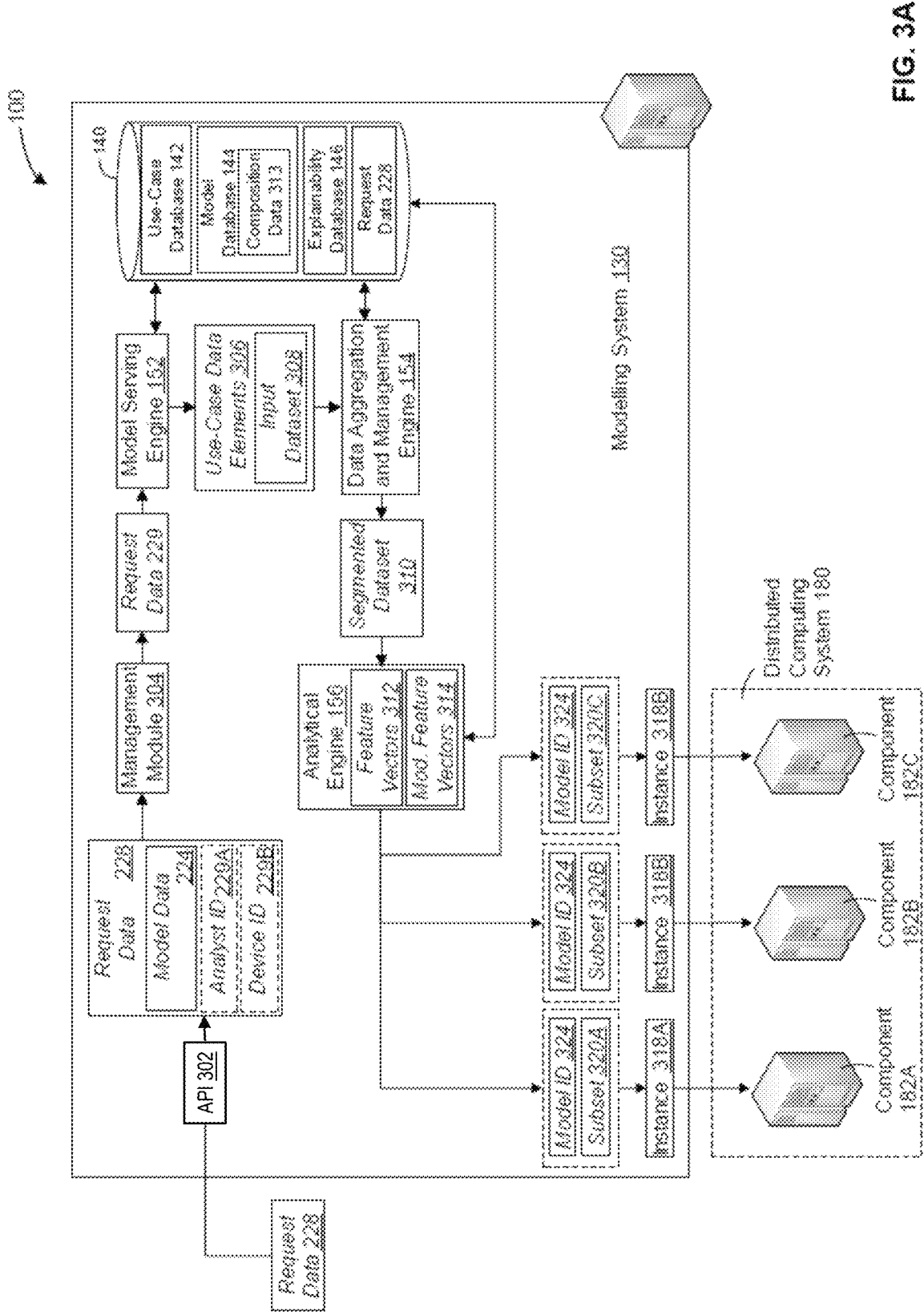
FIGS. 3A and 3B is a block diagram illustrating portions of an exemplary computing environment, in accordance with some exemplary embodiments.

Referring to FIG. 3A, a secure programmatic interface of modelling system 130, such as application programming interface (API) 302, may receive and route request data 228 to a management module 304 executed by modelling system 130. In some instances, API 302 may be associated with or established by executed management module 304, and may facilitate secure, module-to-module communications across network 120 between executed management module 304 and executed messaging module 226 of analyst device 102. Further, and as described herein, all or a selected portion of request data 228 may be encrypted (e.g., using a public cryptographic key of modelling system 130), and executed management module 304 may perform operations that decrypt the encrypted portions of request data 228 using a corresponding private cryptographic key of modelling system 130.

As described herein, request data 228 may include model data 224, which includes, but is not limited to: the one or more identifiers of the machine learning or artificial intelligence process selected by analyst 101; the analytical period selected by analyst 101; the one or more identifiers of the input dataset selected by analyst 101; the sampling data that includes the sample size specified by analyst 101; the feature data characterizing the one or more features selected by analyst 101, the corresponding ranges of feature values specified by analyst 101, and/or the corresponding number of interpolation points; and the segmentation data characterizing the particular segment of the selected input dataset specified by analyst 101 for analysis by the web-based analytical platform. Further, request data 228 may also include user identifier 229A of analyst 101 and, in some instances, device identifier 229B of analyst device 102. In some instances, executed management module 304 may perform operations that store request data 228, which includes model data 224, user identifier 229A, and device identifier 229B, within a corresponding portion of data repository 140.

Further, executed management module 304 may perform operations to provide request data 228 to model serving engine 152 of platform back-end 135, which may be executed by modelling system 130. In some examples, executed model serving engine 152 may perform operations that parse request data 228 to extract one or more portions of model data 224, such as those that identify the input dataset selected by analyst 101. In some examples, and using any of the exemplary processes described herein, executed model serving engine 152 generate elements of use-case data 306 that one or more input datasets consistent with the extracted portions of model data 224, and to provision (e.g., "serve") the generated elements of use-case data 306 to data aggregation and management engine 154 executed by modelling system 130.

For example, executed model serving engine 152 may identify the input dataset selected by analyst 101 based on the one or more identifiers extracted from model data 224, and may perform operations that populate or build analyst-specified input dataset 308 based, among other things, on elements of confidential customer data maintained at modelling system 130 within one or more locally accessible data repositories. As described herein, examples of the confidential customer data may include, but are not limited to, elements of customer profile data identifying and characterizing one or more customers of the financial institution, account data characterizing one or more financial instruments, products, or accounts held by these customers, transaction data identifying and characterizing one or more transaction involving the financial instruments, products, or accounts, or reporting data identifying or characterizing these customers, such as a credit score for one or more of the customers generated by a corresponding reporting entity. Executed model serving engine 152 may package now-populated input dataset 308, along with additional or alternate portions of model data 224, into a corresponding portion of use-case data 306, and may provide use-case data 306 as an input to data aggregation and management engine 154 of platform back-end 135.

In some instances, and upon execution by modelling system 130, data aggregation and management engine 154 may receive use-case data 306 from executed model serving engine 152, and may perform operations that generate a segmented dataset 310 consistent with the analyst-specified sample size and segmentation data. By way of example, executed data aggregation and management engine 154 may perform operations that obtain input dataset 308 from use-case data 306, and that parse model data 224 (e.g., included within use-case data 306 or maintained within data repository 140) to identify the analyst-specified sample size and additionally, or alternatively, the analyst-specified segmentation data. As described herein, the analyst-specified segmentation data may characterize a particular segment of input dataset 308 specified by analyst 101 for analysis by the web-based analytical platform, and executed data aggregation and management engine 154 may perform operations that extract that particular segment from input dataset 308.

Executed data aggregation and management engine 154 may also perform operations that process the extracted segment of input dataset 308 and generate a downsampled segment of input dataset 308 consistent with the analyst-specified sample size, e.g., as maintained within model data 224. In some instances, and as described herein, executed data aggregation and management engine 154 may perform operations, that randomly downsample the extracted segment of input dataset 308 to further reduce an amount of data included within the extracted segment of input dataset 308 in accordance with an analyst-specified sample size, while maintaining a statistical character of that extracted segment. In other instances, model data 224 fails to include segmentation data, or if the segmentation data fails to identify any segment of input dataset 308 (e.g., includes null values, etc.), executed data aggregation and management engine 154 may perform any of the exemplary processes described herein to downsample input dataset 308 in accordance with the analyst-specified sample size.

Executed data aggregation and management engine 154 may package the downsampled segment of input dataset 308 (or alternatively, the downsampled version of input dataset 308) into corresponding portions of segmented dataset 310, which executed data aggregation and management engine 154 may provide as an input to analytical engine 156 of platform back-end 135. In some instances, and upon execution by modelling system 130, analytical engine 156 may perform any of the operations described herein to generate elements of analytical data that, upon visualization by analyst 101 at analyst device 102, enables analyst 101 to inspect a behavior of the selected machine learning or artificial intelligence process during the specified analytical period. The analytical data may include, but is not limited to, one or more elements of the exemplary explainability data, fairness data, performance data, or monitoring data described herein, along with additional elements of summary data that characterize and analysis of an operation or a performance of the selected machine learning or artificial intelligence process during the selected analytical period.

For example, as illustrated in FIG. 3A, executed analytical engine 156 may receive segmented dataset 310 (e.g., the downsampled segment of input dataset 308, or the downsampled version of input dataset 308) from executed data aggregation and management engine 154, and may perform operations that parse model data 224 (e.g., as maintained within data repository 140) to obtain the one or more identifiers of the machine learning or artificial intelligence process selected by analyst 101 and the analytical period selected by analyst 101. Executed analytical engine 156 may also obtain, from model data 224, the feature data characterizing the one or more features selected by analyst 101, the corresponding ranges of feature values specified by analyst 101, in some instances, the corresponding number of interpolation points. In other instances, model data 224 may fail to include the corresponding number of interpolation points for one, or more, of the ranges of feature values, and executed analytical engine 156 may establish a default number of interpolation points (e.g., 200 points) as the corresponding number of interpolation points for each of the ranges of feature values lacking the corresponding number of interpolation points within model data 224.

Based on the segmented dataset 310, executed analytical engine 156 may generate one or more feature vectors 312 for the selected machine learning or artificial intelligence process. For example, and based on the one or more identifiers of the selected machine learning or artificial intelligence process, executed analytical engine 156 may obtain, from model database 144 (e.g., as maintained within data repository 140), composition data 313 that specifies a composition, and a structure, of an input feature vector for the selected machine learning or artificial intelligence process.

In some examples, executed analytical engine 156 may perform operations that generate feature vectors 312 based on corresponding portions of segmented dataset 310 and in accordance with composition data 313. Each of feature vectors 312 may include values of one or more features (e.g., features values), and a composition, and a structure, of the feature values within each of feature vectors 312 may be consistent with composition data 313. For example, the feature values of one or more of feature vectors 312 may be extracted from segmented dataset 310, and additionally, or alternatively, may be derived from the segmented dataset 310, in accordance with composition data 313.

Executed analytical engine 156 may also perform any of the exemplary processes to, based on one or more of feature vectors 312, generate a plurality of modified feature vectors 314 in accordance with portions of the analyst-specified feature data. As described herein, the feature data obtained from model data 224 may specify one or more features for the exemplary explainability analyses described herein, and for each of the features, the feature data may also include a corresponding range of feature values (e.g., a maximum and a minimum value, etc.) and in some instances, the corresponding number of interpolation points for one or more of the feature value range. For each of the specified features, executed analytical engine 156 may perform any of the exemplary processes described to discretize the corresponding feature range into discrete intervals consistent with specified number of interpolation points (or alternatively, with the default number of interpolation points), and to determine, for each of the discrete intervals, a discretized feature value. By way of example, and as described herein, the discretized feature values may vary linearly across the discretized intervals of the feature range, or in accordance with any additional, or alternate non-linear or linear function.

As described herein, executed analytical engine 156 may perform operations that package the discretized feature values into a corresponding set of discretized feature values for each of the specified features, and that compute, for each of the specified feature values, a subset of modified feature vectors 314 based on a perturbation of the one or more extracted feature vectors based on the corresponding set of discretized feature values. By way of example, and for corresponding feature vector and analyst-specified feature, executed analytical engine 156 may perform any of the exemplary processes described herein to identify, within the corresponding feature vector, the feature value associated with the analyst-specific feature, and to generate corresponding ones of modified feature vectors 314 by replacing that feature value with a corresponding one of the discretized feature values for the analyst-specified feature.

Further, and using any of the exemplary processes described herein, modelling system 130 may apply the selected machine learning or artificial intelligence process to each of the one or more of feature vectors 312 and to each modified feature vectors 314, e.g., during the corresponding, analyst-specified analytical period. Based on elements of predictive data output by the applied machine learning or artificial intelligence process, modelling system 130 may perform any of the exemplary processes described herein to generate one or more elements of explainability data that characterize, among other things, a marginal effect of a perturbation in a value of each of the analyst-specified features on an outcome of the selected machine learning or artificial intelligence process, and a contribution of each of the analyst-specified features to the outcome of the selected machine learning or artificial intelligence process.

Figure 3B:
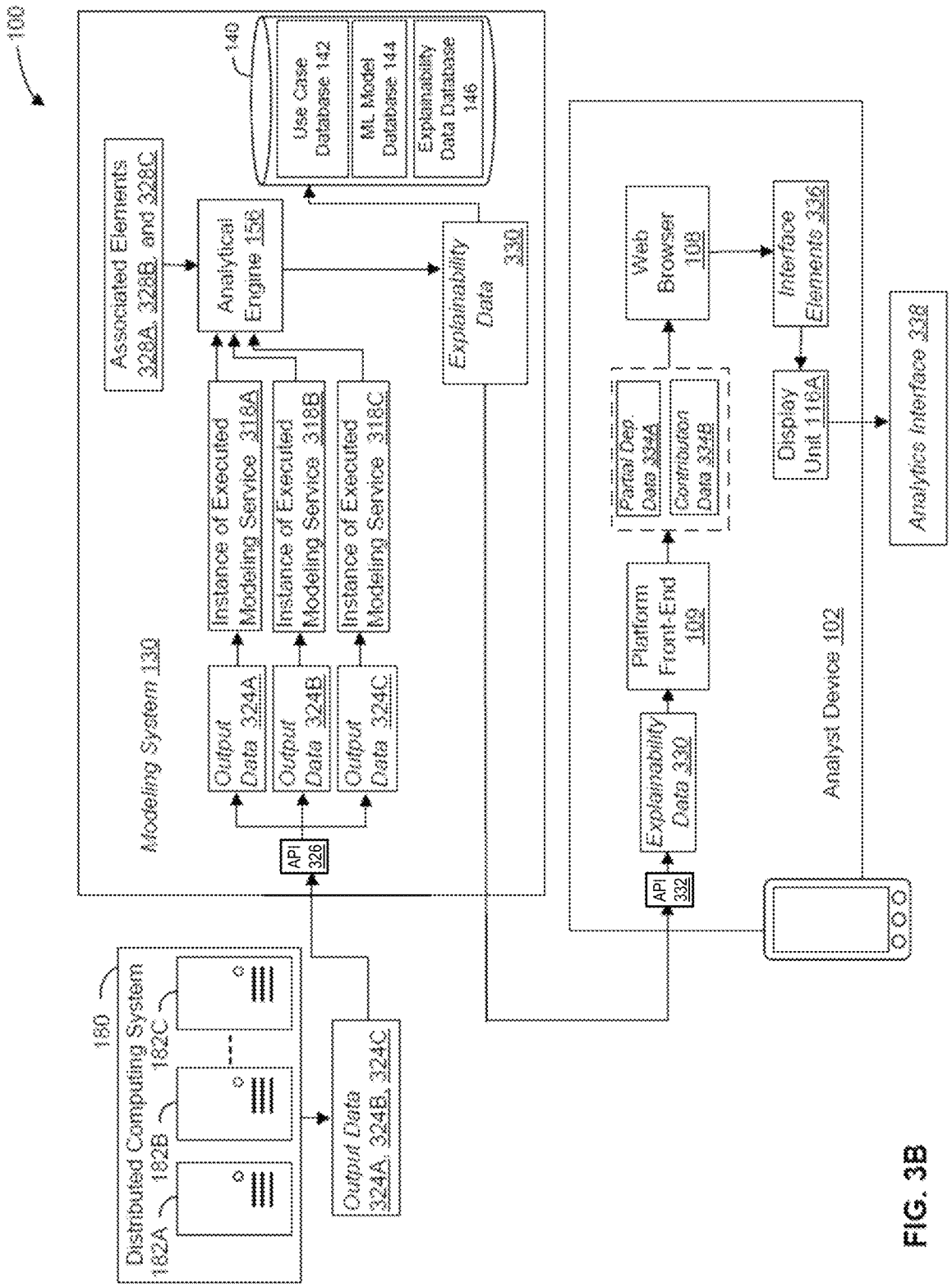

Further, although not illustrated in FIGS. 3A and 3B, executed analytical engine 156 may perform additional of the exemplary processes described herein to generate one or more elements of fairness data and additionally, or alternatively, one or more elements of performance data or monitoring data, based on elements of predictive data output by the selected machine learning or artificial intelligence process. The elements of fairness data may include, among other things elements of comparative data, and values of one or more fairness metrics that, for example, identify and characterize any implicit biases (e.g., between particular demographic groups, etc.) associated with the development or training of the selected machine learning or artificial intelligence process. Further, the elements of performance data may include, among things, values of one or more metrics that characterize a performance or operation of the selected machine learning or artificial intelligence process. In some examples, the elements of monitoring data may include, but are not limited to, additional data characterizing an impact or contribution of one or more input features on the predicted model output (e.g., feature contribution trends for "top" features, etc.), data characterizing a prediction stability of the selected machine learning or artificial intelligence process (e.g., average predictions, ground truths, population stability index (PSI) reports, etc.), or data characterizing one or more evaluation metrics or trends in evaluation metrics, as described herein.

In some instances, executed analytical engine 156 may perform operations that cause modelling system 130 (e.g., the one or more server of modelling system 130, including server 160) to apply the selected machine learning or artificial intelligence process to feature vectors 312 and modified feature vectors 314, and based on the application of the selected machine learning or artificial intelligence process, generate the corresponding elements of predictive output data. In other instances, as described FIG. 3A, modelling system 130 may perform operations that execute one or more remote procedure calls to the distributed components of distributed computing system 180, such as distributed components 182A, 182B, and 182C, and that provision corresponding subsets of feature vectors 312 and modified feature vectors 314 to these distributed components via a corresponding programmatic interface. Each of the distributed components of distributed computing system 180, including distributed components 182A, 182B, and 182C, may perform operations that apply the selected machine learning or artificial intelligence process to respective ones of the subsets of feature vectors 312 and modified feature vectors 314, and that transmit corresponding elements of predicted output data to modelling system 130.

In some examples, executed analytical engine 156 may perform operations that establish programmatically one or more instances of an executed modelling service, and each of the instances of the executed modelling service may perform operations that execute one or more remote procedure calls to a corresponding one of the distributed components of distributed computing system 180. For instance, to programmatically establish the instances of the executed modelling service, executed analytical engine 156 may perform operations that instantiate one or more virtual machines configured to perform the operations that execute one or more remote procedure calls, and clone or spawn the instantiated virtual machine to establish the instances of the executed modelling service. Further, and by way of example, instances of the executed modelling service may perform operations consistent with, and may execute the one or more remote procedure calls in accordance with, a universal remote procedure call (RPC) framework, such as a gRPC™ framework.

As illustrated in FIG. 3A, executed analytical engine 156 may perform operations that establish programmatically instances 318A, 318B, and 318C of the executed modelling service, and each of executed modelling-service instances 318A, 318B, and 318C may perform operations that establish a secure, programmatic channel of communications with a corresponding one of distributed components 182A, 182B, and 182C of distributed computing system 180, e.g., through a programmatic interface. In some instances, executed analytical engine 156 may perform operations that provision a subset of feature vectors 312 and modified feature vectors 314 (e.g., one of feature vector subsets 320A, 320B, and 320C) to a respective one of executed modelling-service instances 318A, 318B, and 318C, along with an identifier 322 of the selected machine learning or artificial intelligence process. Further, each of executed modelling-service instances 318A, 318B, and 318C may be configured to execute a remote procedure call that instructs a corresponding one of distributed components 182A, 182B, and 182C of distributed computing system 180 to apply the selected machine learning or artificial intelligence process (e.g., as identifier by process identifier 322) to the corresponding one of feature vector subsets 320A, 320B, and 320C.

Referring to FIG. 3B, and responsive to the executed remote procedure calls, each of distributed components 182A, 182B, and 182C may perform operations that identify the selected machine learning or artificial intelligence process (e.g., based on process identifier 322), and that apply the selected machine learning or artificial intelligence process to a respective one of feature vector subsets 320A, 320B, and 320C. Further, and based on the application of the selected machine learning or artificial intelligence process to the respective one of feature vector subsets 320A, 320B, and 320C, each of distributed components 182A, 182B, and 182C may generate corresponding elements of predicted output data 324A, 324B, and 324C, and route the corresponding elements of predicted output data 324A, 324B, and 324C back to modelling system 130, e.g., responsive to corresponding ones of the executed remote procedure calls.

A secure programmatic interface of modelling system 130, e.g., application programming interface (API) 326 associated with executed analytical engine 156, may receive each of predicted output data 324A, 324B, and 324C, and may route each of predicted output data 324A, 324B, and 324C to a corresponding one of executed modelling-service instances 318A, 318B, and 318C, e.g., that executed the respective one of the remote procedure calls. In some instances, executed modelling-service instances 318A, 318B, and 318C may receive the corresponding one of predicted output data 324A, 324B, and 324C, and may perform operations that associate each of the discrete elements of predictive output data, e.g., as maintained within the corresponding one of predicted output data 324A, 324B, and 324C, and corresponding one of feature vectors 312 or modified feature vectors 314, e.g., as maintained with a corresponding one of feature vector subsets 320A, 320B, and 320C.

For example, the executed modelling-service instances 318A, 318B, and 318C may each perform operations that route the associated elements of predicted output data 324A, 324B, and 324C and the corresponding ones of feature vectors 312 or modified feature vectors 314 (e.g., as specified within respective ones of associated elements 328A, 328B, and 328C of FIG. 3B) back to executed analytical engine 156. In some instances, and based on the associated elements of predicted output data 324A, 324B, and 324C and corresponding one of feature vectors 312 or modified feature vectors 314 (e.g., as maintained within associated elements 328A, 328B, and 328C received from executed modelling-service instances 318A, 318B, and 318C), executed analytical engine 156 may perform any of the exemplary processes described herein to generate one or more elements of explainability data 330, and to store the generated elements of explainability data 330 within a corresponding portion of data repository 140, e.g., within explainability database 146 and in conjunction with model data 224.

In some examples, executed analytical engine 156 may perform operations that generate, for each of the analyst-specified features, elements of data establishing a partial dependency plot that characterize, among other things, a marginal effect of a perturbation in a value of each of the analyst-specified features on the predicted outcome of the selected machine learning or artificial intelligence process. As described herein, the partial dependency plot for each of the analyst-specified features inspects a marginal effect of that analyst-specified feature on the predicted output, and executed analytical engine may perform operations that generate values for the partial dependency plot by averaging the discrete values associated with each element of predicted output data 324A, 324B, and 324C.

For instance, and for a particular one of the analyst-specified features f, each of modified feature vectors 314 may correspond to, and include, one of a number of equally spaced feature values $f_i$ (e.g., an analyst-specified or default number of interpolation points i) across the corresponding feature range specified within model data 224. Executed analytical engine 156 may also perform operations that access the elements of predicted output data 324A, 324B, and 324C associated with each of the number of equally spaced feature values $f_i$ (and as such, with corresponding ones of the modified feature vectors 314), and that average the value within each of the elements of predicted output data 324A, 324B, and 324C to generate a point $p_i$ in a partial dependency plot $(f_i, p_i)$ for that analyst-specified feature. Executed analytical engine 156 may repeat any of these exemplary processes for each additional, or alternate, one of equally spaced feature values $f_i$ of the analyst-specified feature, and for each additional, or alternate, one of the analyst-specified features.

Additionally, in some examples, executed analytical engine 156 may also perform operations that generate, for each of the analyst-specified features, a feature value contribution that characterizes a contribution of the analyst-specified features to the outcome of the selected machine learning or artificial intelligence process. For example, executed analytical engine 156 may compute a Shapley value feature contribution for each of the analyst-specified features based on the elements of predicted output data 324A, 324B, and 324C and corresponding ones of the modified feature vectors 314. In some instances, executed analytical engine 156 may calculate one or more of the Shapley value feature contributions in accordance with a Shapley Additive explanations (SHAP) algorithm (e.g., when the selected machine learning or artificial intelligence process corresponds to a gradient-boosted decision tree algorithm), or in accordance with an integrated gradient algorithm (e.g., when the selected machine learning or artificial intelligence process corresponds to a deep neural-network models).

Further, in some examples, executed analytical engine 156 may compute an observation-specific Shapley value feature contribution, $\varphi_i$, for a given analyst-specified feature and for each of a number of n observations output by the selected machine learning or artificial intelligence process. Given the multiple observations output by the selected machine learning or artificial intelligence process, executed analytical engine 156 may aggregate the observation-specific Shapley value feature contributions, and compute the aggregated Shapley value feature contribution for the given analyst-specific feature on a basis of total contribution (e.g., as $$\frac{1}{n}\sum_{i}^{n}|\varphi_i|$$

on a basis of net contribution (e.g., as $$\sum_{i}^{n}\varphi_i$$

on a basis of a total positive contribution (e.g., as $$\frac{1}{n}\sum_{i}^{n}\max(0, \varphi_i)$$

on a basis of total negative contribution (e.g., as $$\frac{1}{n}\sum_{i}^{n}\min(0, \varphi_i)$$

or on) a basis of a maximum one-sided contribution (e.g., as $$\frac{1}{n}\sum_{i}^{n}\max(\max(0, \varphi_i), |\min(0, \varphi_i)|)$$

In the above formulas, n represents the number of observations, i represents an index of an observation in the given sample, and $\varphi_i$ is the observation-specific Shapley value feature combination for the given analyst-specific feature for observation i.

In some examples, executed analytical engine 156 may package the data characterizing the partial dependency plot for each of the analyst-specified features, and the feature value contributions for each of the analyst-specified features, into corresponding portions of explainability data 330. Executed analytical engine 156 may perform further operations that cause modelling system 130 to transmit explainability data across network 120 to analyst device 102. In some instances, and prior to transmission to modelling system 130, executed analytical engine 156 may also perform operations that encrypt all, or a selected portion, of explainability data 330 using corresponding encryption key, such as a public cryptographic key associated with analyst device 102 or with platform front-end 109.

A secure programmatic interface of analyst device 102, such as application programming interface (API) associated with executed platform front-end 109, may receive explainability data 330 and route explainability data to executed platform front-end 109. Executed platform front-end 109 may process and parse explainability data 330 to extract partial dependency data 334A, which characterizes the partial dependency plot for each of the analyst-specified features, and contribution data 334B, which includes the feature value contributions for each of the analyst-specified features (e.g., the Shapley feature value contributions, etc.). Executed platform front-end 109 may provide partial dependency data 334A and contribution data 334B as inputs to executed web browser 108, which may perform operations that generate one or more interface elements 336 representative of the partial dependency plot for each of the analyst-specified features an additionally, or alternatively, the feature value contributions. Executed web browser 108 may route interface elements 336 to display unit 116A, which render interface elements 336 for presentation to analyst 101 within an analytics interface 338.

Figure 3C:
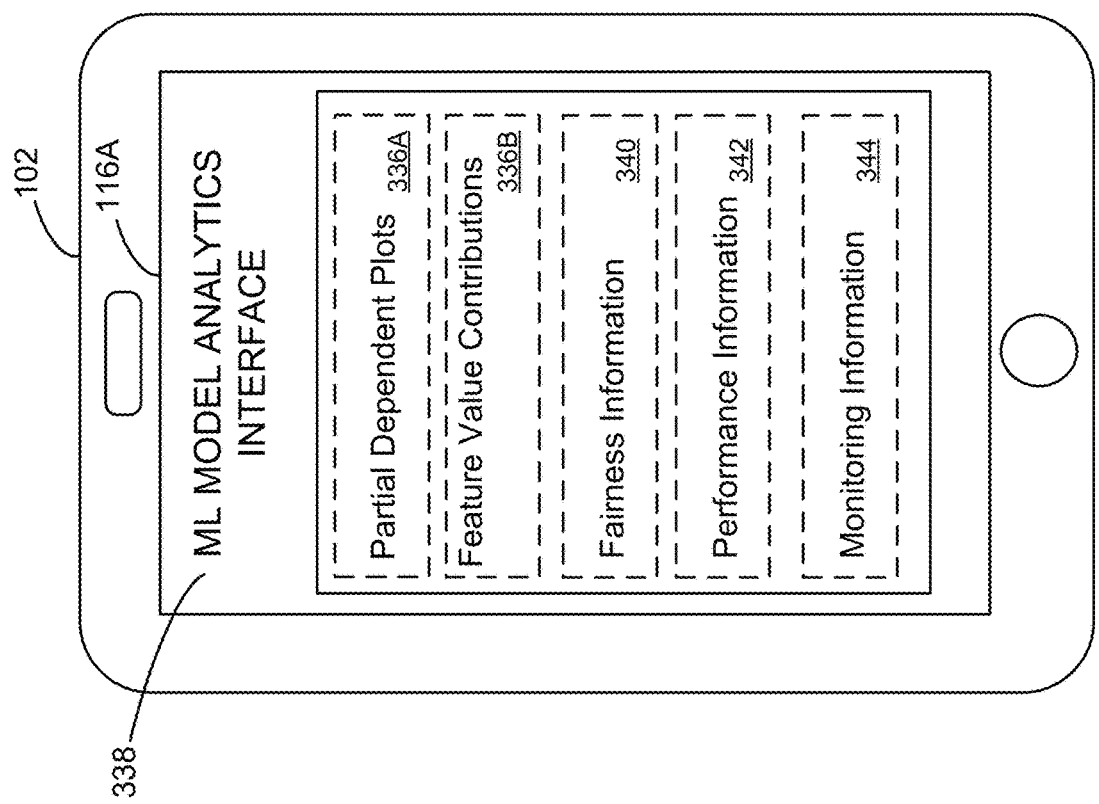
FIG. 3C is a diagram illustrating portions of an exemplary graphical user interface, in accordance with some exemplary embodiments.

Referring to FIG. 3C, analytics interface 338 may include first interface elements 336A associated with the partial dependency plots of the analyst-specified features, and second interface elements 336B associated with the feature value contributions for each of the analyst-specified features. In some instances, each of first interface elements 336A and second interface elements 336B may include one or more selectable icons, and analyst 101 may provide additional input to analyst device 102 (e.g., via input unit 116B) that selects one or more of the selectable icons associated with first interface elements 336A and additionally, or alternatively, with second interface elements 336B.

For example, upon selection of the one or more selectable icons associated with first interface elements 336A, executed platform front-end 109 and executed web browser 108 may perform any of the exemplary processes described herein to generate, and present within analytics interface 338, one or more additional interface elements that provide analyst 101 with a graphical representation of one or more of the partial dependency plots for the analyst-specified features, e.g., within one or more additional display screens of analytics interface 338 or within a pop-up window within analytics interface 338 that obscures portions of the digital content presented within analytics interface 338.

In other examples, upon selection of the one or more selectable icons associated with second interface elements 336B, executed platform front-end 109 and executed web browser 108 may perform any of the exemplary processes described herein to generate, and present within analytics interface 338, one or more additional interface elements that provide analyst 101 with a graphical representation of one or more of the feature value contributions for the analyst-specified features, including the Shapley feature value contributions described herein. For example, the more additional interface elements that provide analyst 101 with the graphical representation of one or more of the feature value contributions may be presented within one or more additional display screens of analytics interface 338 or within a pop-up window within analytics interface 338 that obscures portions of the digital content presented within analytics interface 338. Further, in some examples, analyst device 102 may perform operations that present the graphical representations of the partial dependency plots and feature value contributions together within the one or more additional display screens or the pop-up window, as described herein.

In some examples, executed analytical engine 156 may perform any of the exemplary processes described herein to generate one or more elements of explainability data 330 that characterize, among other things, a marginal effect of a perturbation in a value of each of the analyst-specified features on an outcome of the selected machine learning or artificial intelligence process, and a contribution of each of the analyst-specified features to the outcome of the selected machine learning or artificial intelligence process. In some instances, executed analytical engine 156 may generate the elements of explainability data 330, and provision the explainability data to analyst device 102 for presentation within analytics interface 338, during analyst-specified analytical periods that include an initial training and development period, or during a subsequent deployment period.

In other examples, not illustrated in FIGS. 3A and 3B, executed analytical engine 156 may perform additional of the exemplary processes described herein to generate, and based on modified feature vectors 314 and on predicted output data 324A, 324B, and 324C, one or more elements fairness data and additionally, or alternatively, one or more elements of performance data, associated with the selected machine learning or artificial intelligence process. The elements of fairness data may include, among other things elements of comparative data, and values of one or more fairness metrics that, for example, identify and characterize any implicit biases (e.g., between particular demographic groups, etc.) associated with the development or training of the selected machine learning or artificial intelligence process. Further, the elements of performance data may include, among things, values of one or more metrics that characterize a performance or operation of the selected machine learning or artificial intelligence process. In some instances, executed analytical engine 156 may generate the elements of fairness data or the performance data, and provision the elements of fairness data or the performance data to analyst device 102 for presentation within analytics interface 338, during analyst-specified analytical periods that include an initial training and development period, or during a subsequent deployment period.

Modelling system 130 may transmit all, or selected portions of, the fairness data or performance data to analyst device 102, and as described herein, executed platform front-end 109 and executed web browser 108 may perform any of the exemplary processes described herein to, present a graphical representation of the fairness data or he performance data within a portion of the digital interface associated with the web-based analytical platform (e.g., via display unit 116A). For example, as illustrated in FIG. 3C, analytics interface 338 may include interface elements 340 associated with the elements of fairness data, and interface elements 342 associated with the elements of performance data.

As described herein, interface elements 340 and 342 may include one or more selectable icons, and analyst 101 may provide additional input to analyst device 102 (e.g., via input unit 116B) that selects one or more of the selectable icons associated with interface elements 340 and additionally, or alternatively, with interface elements 342. For example, upon selection of the one or more selectable icons associated with first interface elements 340, executed platform front-end 109 and executed web browser 108 may perform any of the exemplary processes described herein to generate, and present within analytics interface 338, one or more additional interface elements that provide analyst 101 with a graphical representation of the fairness data for the analyst-specified features. Similarly, upon selection of the one or more selectable icons associated with interface elements 342, executed platform front-end 109 and executed web browser 108 may perform any of the exemplary processes described herein to generate, and present within analytics interface 338, one or more additional interface elements that provide analyst 101 with a graphical representation of the performance data for the analyst-specified features. In some instances, the one or more additional interface elements associated with the fairness or performance data may be presented within one or more additional display screens of analytics interface 338 or within a pop-up window within analytics interface 338 that obscures portions of the digital content presented within analytics interface 338.

Further, although not illustrated in FIGS. 3A and 3B, executed analytical engine 156 may perform any of the exemplary processes described herein to generate, and based on modified feature vectors 314 and on predicted output data 324A, 324B, and 324C, one or more elements of monitoring data that characterizes a performance or operation of the trained machine learning or artificial intelligence process, e.g., during a post-training deployment period. For example, the monitoring data may include additional data characterizing an impact or contribution of one or more input features on the predicted model output (e.g., feature contribution trends for "top" features, etc.), data characterizing a prediction stability of the machine learning model (e.g., average predictions, ground truths, population stability index (PSI) reports, etc.), or data characterizing one or more evaluation metrics or trends in evaluation metrics. Modelling system 130 may transmit all, or selected portions of the monitoring data to analyst device 102, and as described herein, executed platform front-end 109 may perform operations that, in conjunction with executed web browser 108, present a graphical representation of the monitoring data within a portion of the digital interface associated with the web-based analytical platform.

For example, as illustrated in FIG. 3C, analytics interface 338 may include interface elements 344 associated with the elements of monitoring data. As described herein, interface elements 342 may include one or more selectable icons, and analyst 101 may provide additional input to analyst device 102 (e.g., via input unit 116B) that selects one or more of the selectable icons associated with interface elements 342. For example, upon selection of the one or more selectable icons associated with interface elements 344, executed platform front-end 109 and executed web browser 108 may perform any of the exemplary processes described herein to generate, and present within analytics interface 338, one or more additional interface elements that provide analyst 101 with a graphical representation of the monitoring data, e.g., one or more additional display screens of analytics interface 338 or within a pop-up window within analytics interface 338 that obscures portions of the digital content presented within analytics interface 338.

Figure 4:
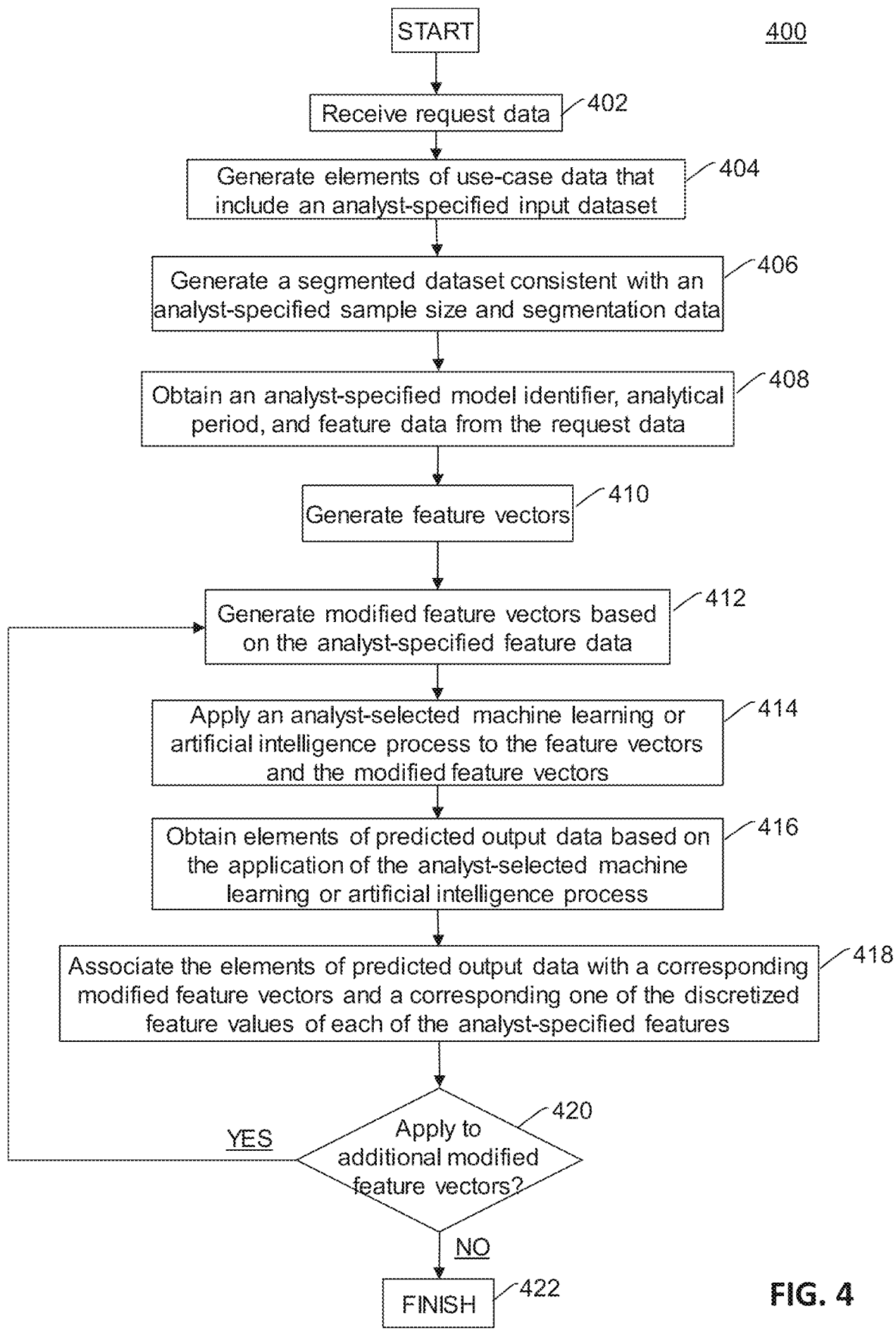
FIG. 4 is a flowchart of an exemplary process for applying a machine learning or artificial intelligence process to modified feature vectors generated from a segmented portion of an analyst-selected input dataset, in accordance with some exemplary embodiments.

FIG. 4 is a flowchart of an exemplary process 400 for applying a machine learning or artificial intelligence process to modified feature vectors generated from a segmented portion of an analyst-selected input dataset, in accordance with some exemplary embodiments. For example, one or more computing systems associated with a financial institution, such as modelling system 130, may perform any of the exemplary steps of process 400.

Referring to FIG. 4, modelling system 130 may receive one or more elements of request data generated and transmitted by a computing system or device associated with an analyst, such as analyst device 102 (e.g., in step 402 of FIG. 4). As described herein, the received request data may include corresponding elements of model data, which includes, but is not limited to: the one or more identifiers of a machine learning or artificial intelligence process selected by the analyst; the analytical period selected by the analyst (e.g., an initial training and development period, a subsequent deployment period, etc.); one or more identifiers of an input dataset selected by the analyst; a sample size specified by the analyst; feature data characterizing the one or more features selected by the analyst, corresponding ranges of feature values specified by the analyst, and/or a corresponding number of interpolation points for one or more of the ranges of feature values; and segmentation data characterizing a particular segment of the selected input dataset specified by the analyst for analysis by the web-based analytical platform. Further, the request data may also include an identifier of the analyst and, in some instances, an identifier of the system or device associated with the analyst.

In some examples, modelling system 130 may perform any of the exemplary processes described herein to generate elements of use-case data that include the input dataset specified by the analyst (e.g., in step 404 of FIG. 4). As described herein, the input dataset may include, among other things, on elements of confidential customer data maintained at modelling system 130 within one or more locally accessible data repositories. Modelling system 130 may also perform any of the exemplary processes described herein to generate a segmented dataset based on the input dataset and consistent with the analyst-specified sample size and segmentation data (e.g., in step 406 of FIG. 4).

For example, modelling system 130 may perform any of the exemplary processes described herein to obtain the input dataset from the use-case data, and that obtain the analyst-specified sample size and additionally, or alternatively, the analyst-specified segmentation data, from the received request data (e.g., also in step 406). Further, in step 406, modelling system 130 may perform any of the exemplary processes described herein to extract the analyst-specified segment from the input dataset, and to process the extracted segment of the input dataset and generate a downsampled segment of the input dataset consistent with the analyst-specified sample size. For example, in step 406, modelling system 130 may perform any of the exemplary processes described herein to randomly downsample the extracted segment of the input dataset to further reduce an amount of data included within the extracted segment of the input dataset in accordance with the analyst-specified sample size, while maintaining a statistical character of that extracted segment.

Modelling system 130 may perform any of the exemplary processes described herein to obtain, from the received request, the one or more identifiers of the machine learning or artificial intelligence process selected by the analyst, the analytical period selected by the analyst, and the feature data characterizing the one or more features selected by the analyst, the corresponding ranges of feature values specified by the analyst, and in some instances, the corresponding number of interpolation points associated with one or more of the ranges of feature values (e.g., in step 408 of FIG. 4).

Based on the segmented dataset 310, modelling system 130 may perform any of the exemplary processes described herein to generate one or more feature vectors for the selected machine learning or artificial intelligence process (e.g., in step 410 of FIG. 4). Further, modelling system 130 may also perform any of the exemplary processes described herein to generate a plurality of modified feature vectors that are consistent with, and based upon, one or more portions of the analyst-specified feature data (e.g., in step 412 of FIG. 4).

In step 414 of FIG. 4, modelling system 130 may also perform any of the exemplary processes described herein to apply the selected machine learning or artificial intelligence process to the generated feature vectors and to each of the modified feature vectors, e.g., during the corresponding, analyst-specified analytical period. For example, in step 414, modelling system 130 may perform any of the exemplary processes described herein to execute one or more remote procedure calls to the distributed components of a distributed computing system, such as distributed components 182A, 182B, and 182C of distributed computing system 180, and that provision corresponding subsets of the generated feature vectors and the modified feature vectors to these distributed components via a corresponding programmatic interface. As described herein, each of the distributed components of distributed computing system 180, including distributed components 182A, 182B, and 182C, may perform operations that apply the selected machine learning or artificial intelligence process to respective ones of the subsets of the generated feature vectors and the modified feature vectors, and that transmit corresponding elements of predicted output data to modelling system 130.

In some examples, modelling system 130 may perform any of the exemplary processes described herein to receive the elements of predicted output data from each of the distributed components (e.g., in step 416 of FIG. 4), and to associate each of the elements of predicted output data with a corresponding modified feature vector and as such, with a corresponding one of the discretized feature values of each of the analyst-specified features (e.g., in step 418 of FIG. 4). Modelling system 130 may also store the elements of predicted output data, and the associated corresponding modified feature vectors, within a portion of a data repository (e.g., also in step 418).

Modelling system 130 may also whether to apply the selected machine learning or artificial intelligence process to additional, or alternate, modified feature vectors associated with the analyst-specified features (e.g., in step 420 of FIG. 1). For example, modelling system 130 may implement an explainability analysis of the analyst-selected features based on the predictive output data received from distributed components of distributed computing system 180. The explainability analysis may, in some instances, include generating data characterizing one or more partial dependency plots that inspect a marginal effect of corresponding ones of the analyst-specified features on the received output data from the selected machine learning model, and generating feature value contributions characterizing a contribution of each selected feature to the output data of the selected machine learning or artificial intelligence process. In some examples, in step 420, modelling system 130 may determine whether predicted output data is sufficient to complete the explainability analysis, e.g., to generate the data characterizing one or more partial dependency plots and the feature value contributions.

If modelling system 130 were to determine to apply the selected machine learning or artificial intelligence process to the additional, or alternate, modified feature vectors (e.g., step 420; YES), exemplary process may pass back to step 412, and modelling system 130 may also perform any of the exemplary processes described herein to generate additional, or alternate, modified feature vectors that are consistent with, and based upon, one or more portions of the analyst-specified feature data.

Alternatively, if modelling system 130 were to decline to apply the selected machine learning or artificial intelligence process to the additional, or alternate, modified feature vectors (e.g., step 420; NO), exemplary process 400 is then complete in step 422.

Figure 5:
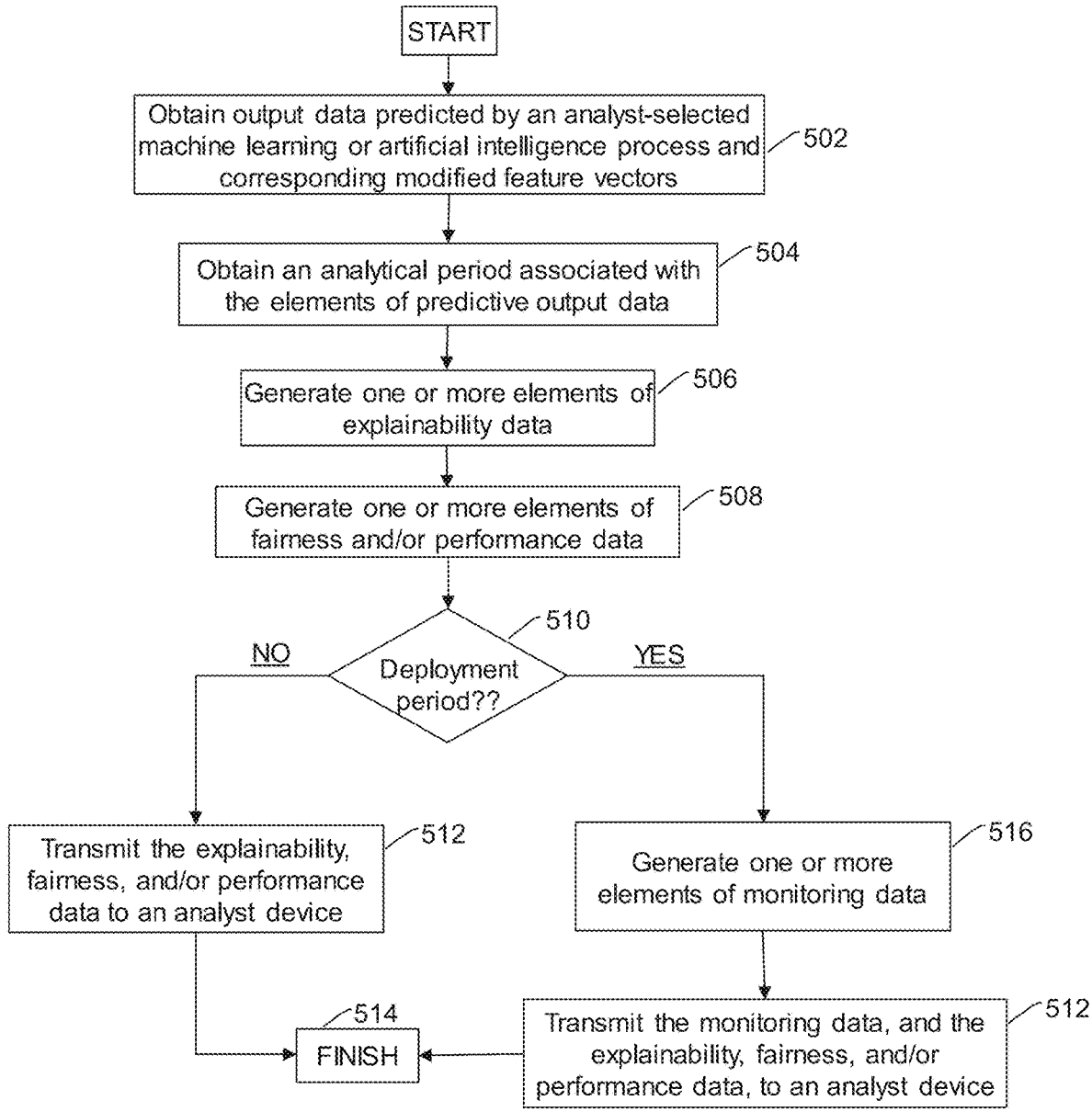
FIG. 5 illustrates a flowchart of an exemplary process for dynamically analyzing a behavior, operation, or performance of a machine learning or artificial intelligence model during one or more analytical periods, in accordance with some exemplary embodiments.

FIG. 5 illustrates a flowchart of an exemplary process 500 for dynamically analyzing a behavior, operation, or performance of a machine learning or artificial intelligence model during one or more analytical periods, in accordance with some exemplary embodiments. For example, one or more computing systems associated with a financial institution, such as modelling system 130, may perform any of the exemplary steps of process 500

Referring to FIG. 5, modelling system 130 may perform any of the exemplary processes described herein to obtain, from a data repository, one or more elements of predicted output data generated based on an application of a selected machine learning or artificial intelligence process to generated feature vectors and to modified feature vectors associated with corresponding, analyst-specified features, along with the corresponding modified feature vectors (e.g., in step 502 of FIG. 5). For example, modelling system 130 may perform any of the exemplary processes described herein to generate, in conjunction with the distributed components of distributed computing system 180, elements of predicted output data in accordance with one or more elements of request data generated by platform front-end 109 executed at analyst device 102.

In some examples, modelling system 130 may perform operations that obtain, from the request data, information identifying an analytical period associated with the elements of predictive output data (e.g., in step 504 of FIG. 5). For instance, and as described herein, the analytical period may correspond to an initial training and development period, or to a subsequent deployment period.

Based on the obtained elements of predicted output data and the modified feature vectors, modelling system 130 may, for example, perform any of the exemplary processes described herein to generate one or more elements of explainability data that characterize, among other things, a marginal effect of a perturbation in a value of each of the analyst-specified features on an outcome of the selected machine learning or artificial intelligence process, and a contribution of each of the analyst-specified features to the outcome of the selected machine learning or artificial intelligence process (e.g., in step 506 of FIG. 5). For example, and as described herein, elements of the explainability data may characterize one or more partial dependency plots that for corresponding ones of he analyst-specified features (e.g., that characterize the marginal effect of a perturbation in the value of each of the analyst-specified features on the predicted outcome of the selected machine learning or artificial intelligence process) and additionally, or alternatively, a feature value contribution, such as a Shapley feature value contribution, for one or more of the analyst-specified feature (e.g., that characterize the contribution of the one or more analyst-specified features to the predicted outcome of the selected machine learning or artificial intelligence process).

In some instances, modelling system 130 may perform any of the exemplary processes described herein to generate one or more elements of fairness data and additionally, or alternatively, one or more elements of performance data, based on the obtained elements of predicted output data and the modified feature vectors (e.g., in step 508 of FIG. 5). As described herein the elements of fairness data may include, among other things elements of comparative data, and values of one or more fairness metrics that, for example, identify and characterize any implicit biases (e.g., between particular demographic groups, etc.) associated with the development or training of the selected machine learning or artificial intelligence process. Further, the elements of performance data may include, among things, values of one or more metrics that characterize a performance or operation of the selected machine learning or artificial intelligence process.

Modelling system 130 may perform operations that determine whether the analytical period specified by the analyst (and included within the received report data) corresponds to a post-training deployment period (e.g., in step 510). If modelling system 130 were to establish that the analytical period corresponds to a training and development period and not the post-training deployment period (e.g., step 510; NO), modelling system 130 may perform any of the exemplary processes described herein to transmit all, or a selected portion, of the explainability, fairness, or performance data across network 120 to the computing system or device of the analyst (e.g., in step 512). As described herein, one or more application programs executed at the computing system or device of the analyst (e.g., platform front-end 109 and web browser 108 executed by analyst device 102) may perform operations that present a graphical representation of the explainability, fairness, or performance data within portions of a corresponding digital interface (e.g., within one or more screens of analytics interface 338). Exemplary process 500 is then complete in step 514.

Alternatively, if modelling system 130 were to establish that the analytical period corresponds to the post-training deployment period (e.g., step 510; YES), modelling system 130 may perform any of the exemplary processes described herein to generate one or more elements of monitoring data associated with post-training deployment period based on the obtained elements of predicted output data and the modified feature vectors (e.g., in step 516 of FIG. 5). In some examples, the elements of monitoring data may include, but are not limited to, additional data characterizing an impact or contribution of one or more input features on the predicted model output (e.g., feature contribution trends for "top" features, etc.), data characterizing a prediction stability of the selected machine learning or artificial intelligence process (e.g., average predictions, ground truths, population stability index (PSI) reports, etc.), or data characterizing one or more evaluation metrics or trends in evaluation metrics, as described herein.

Modelling system 130 may perform any of the exemplary processes described herein to transmit the modelling data in conjunction with all, or a selected portion, of the explainability, fairness, or performance data across network 120 to the computing system or device of the analyst (e.g., in step 518 of FIG. 5). Exemplary process 500 is then complete in step 514.

III. Exemplary Computing Architectures

Embodiments of the subject matter and the functional operations described in this specification may be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, web browser 108, platform front-end 109, platform back-end 135, model serving engine 152, data aggregation and management engine 154, analytical engine 156, messaging module 226, management module 304, instances 318A, 318B, and 318C of the executed modelling services, and application programming interfaces (APIs) 326 and 332, may be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions may be encoded on an artificially generated propagated signal, such as a machine-generated electrical, optical, or electromagnetic signal that is generated to encode information for transmission to suitable receiver apparatus for execution by a data processing apparatus. The computer storage medium may be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system may also be or further include special purpose logic circuitry, such as an FPGA (field programmable gate array) or an ASIC (application-specific integrated circuit). The apparatus, device, or system may optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, may be written in any form of programming language, including compiled or interpreted languages, or declarative or procedural languages, and it may be deployed in any form, including as a stand-alone program or as a module, component, subroutine, or other unit suitable for use in a computing environment. A computer program may, but need not, correspond to a file in a file system. A program may be stored in a portion of a file that holds other programs or data, such as one or more scripts stored in a markup language document, in a single file dedicated to the program in question, or in multiple coordinated files, such as files that store one or more modules, sub-programs, or portions of code. A computer program may be deployed to be executed on one computer or on multiple computers that are located at one site or distributed across multiple sites and interconnected by a communication network, such as network 120 described herein.

The processes and logic flows described in this specification may be performed by one or more programmable computers executing one or more computer programs to perform functions by operating on input data and generating output. The processes and logic flows may also be performed by, and apparatus may also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer may be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user may provide input to the computer. Other kinds of devices may be used to provide for interaction with a user as well; for example, feedback provided to the user may be any form of sensory feedback, such as visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's device in response to requests received from the web browser.

Implementations of the subject matter described in this specification may be implemented in a computing system that includes a back-end component, such as a data server, or that includes a middleware component, such as an application server, or that includes a front-end component, such as a computer having a graphical user interface or a Web browser through which a user may interact with an implementation of the subject matter described in this specification, or any combination of one or more such back-end, middleware, or front-end components. The components of the system may be interconnected by any form or medium of digital data communication, such as a communication network. Examples of communication networks, such as network 120, include a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems described herein may perform operations that establish and maintain one or more secure channels of communication across the communications network (e.g., network 120), such as, but not limited to, a transport layer security (TSL) channel, a secure socket layer (SSL) channel, or any other suitable secure communication channel.

The exemplary computing systems or environments described herein may include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, may be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a memory storing instructions;
   a communications interface; and
   at least one processor coupled to the memory and the communications interface, the at least one processor being configured to execute the instructions to:
   receive elements of request data from a device via the communications interface, the elements of request data comprising a first identifier of a machine learning process, a second identifier of a dataset, a third identifier of a corresponding analytical period, feature data that specifies an input feature of the machine learning process, a feature range associated with the specified input feature, and a number of interpolation points associated with the specified feature range, and segmentation data that specifies a composition of a segment of the dataset;
   determine a plurality of candidate feature values within the specified feature range based on the specified number of interpolation points;
   obtain composition data associated with the machine learning process from the memory based on the first identifier, and obtain the dataset from the memory based on the second identifier, the composition data characterizing a composition of a feature vector associated with the machine learning process;
   perform operations that access the segment of the dataset in accordance with the segmentation data, and that generate a segmented dataset that includes at least a portion of the accessed segment of the dataset;
   based on the segmented dataset, generate the feature vector in accordance with the composition data, and generate a plurality of modified feature vectors based on the feature vector, each of the modified feature vectors comprising a modified feature value of the specified input feature and a corresponding one of the plurality of candidate feature values;

based on an application of the machine learning process to the feature vector and to the modified feature vectors during the corresponding analytical period, generate predictive output data associated with corresponding ones of the feature vector and the modified feature vectors and first explainability data associated with the specified input feature;

based on at least the third identifier, identify an analytical process associated with the machine learning process and the corresponding analytical period, and based on an application of the analytical process to at least a portion of the predictive output data, generate a value of one or more metrics that characterize a performance or an operation of the machine learning process during the corresponding analytical period; and transmit the first explainability data and the one or more metric values to the device via the communications interface, the device being configured to execute an application program that presents a graphical representation of the first explainability data and the one or more metric values within a portion of a digital interface.

2. The apparatus of claim 1, wherein:
the feature vector comprises feature values of a plurality of input features of the machine learning process, the plurality of input features comprising the specified input feature and one or more additional input features of the machine learning process; and
each of the modified feature vectors comprises a corresponding one of the modified feature values of the specified input feature and the feature values of the one or more additional input features.

3. The apparatus of claim 1, wherein:
the elements of request data further comprise sample data associated with the dataset, the sample data comprising a sample size;
the at least one processor is further configured to execute the instructions to perform operations that process the accessed segment of the dataset and generate a downsampled segment in accordance with the sample size, the downsampled segment having a composition consistent with the composition of the segment; and
the segmented dataset comprises the downsampled segment.

4. The apparatus of claim 1, wherein:
the at least one processor is further configured to execute the instructions to, based on the application of the machine learning process to the feature vector and to the modified feature vectors, generate data that characterizes a partial dependency plot associated with the specified input feature;
the first explainability data comprises the data that characterizes the partial dependency plot; and
the executed application program causes the device to present the partial dependency plot within the portion of the digital interface.

5. The apparatus of claim 1, the at least one processor is further configured to execute the instructions to:
based on the application of the machine learning process to the feature vector and to the modified feature vectors, generate second explainability data indicative of a contribution of the specified input feature to an outcome of the machine learning process; and
transmit the second explainability data to the device via the communications interface, the executed application program causing the device to present a graphical representation of the second explainability data within an additional portion of the digital interface.

6. The apparatus of claim 5, wherein:
the second explainability data comprises a Shapley value feature contribution for the specified input feature; and
the at least one processor is further configured to execute the instructions to determine the Shapley value feature contribution based on the application of the machine learning process to the obtained and modified feature vectors.

7. The apparatus of claim 1, the at least one processor is further configured to execute the instructions to:
based on the application of the machine learning process to the feature vector and to the modified feature vectors, and based the application of the analytical process to at least the portion of the predictive output data, generate one or more elements of fairness data associated with the machine learning process during the corresponding analytical period, the one or more elements of fairness data comprising at least a subset of the one or more metric values; and
transmit the elements of fairness data to the device via the communications interface, the executed application program causing the device to present a graphical representation of at least one of the elements of fairness data within an additional portion of the digital interface.

8. The apparatus of claim 1, the at least one processor is further configured to execute the instructions to:
based on the application of the machine learning process to the feature vector and to the modified feature vectors, based on the application of the analytical process to at least the portion of the predictive output data, generate performance data comprising the value of one or more metrics that characterize the performance or operation of the machine learning process during the corresponding analytical period; and
transmit the performance data to the device via the communications interface, the executed application program causing the device to present a graphical representation of the performance data within an additional portion of the digital interface.

9. The apparatus of claim 1, the at least one processor is further configured to execute the instructions to:
provide, through a first remote procedure call, the feature vector to an executed first modelling service via a first programmatic interface;
obtain a first element of predictive data in response to the first remote procedure call, the first element of predictive data being indicative of an outcome of the application of the machine learning process to the obtained feature vector;
provide, through second remote procedure calls, each of the modified feature vectors to an executed second modelling service through a corresponding second programmatic interface;
obtain a second element of predictive data in response to the each of the second remote procedure calls, each of the second elements of predictive data being indicative of an outcome of the application of the machine learning process to a corresponding one of the modified feature vectors; and
generate the first explainability data associated with the specified input feature based on the first and second elements of predictive data.

10. The apparatus of claim 1, wherein:
the machine learning process comprises a trained machine learning process;
the corresponding analytical period comprises a deployment period; and
the at least one processor is further configured to execute the instructions to:
  based on the application of the trained machine learning process to the feature vector and to the modified feature vectors, and based on the application of the analytical process to at least the portion of the predictive output data, generate monitoring data that includes the value of one or more metrics that characterize the performance or operation of the trained selected machine learning process during the deployment period; and
  transmit the monitoring data to the device via the communications interface, the executed application program causing the device to present a graphical representation of the monitoring data within an additional portion of the digital interface.

11. The apparatus of claim 1, wherein:
the feature vector comprises feature values of a plurality of input features of the machine learning process; and
the at least one processor is further configured to execute the instructions to:
  extract a first feature value from the portion of the dataset, and compute a second feature values based on the portion of the dataset; and
  perform operations that package the first and second feature values into corresponding portions of the feature vector in accordance with the composition data.

12. The apparatus of claim 1, wherein:
the corresponding analytical period comprises a training period; and
the at least one processor is further configured to execute the instructions to:
  based on an application of the analytical process to at least one of the portion of the dataset or a portion of the predictive output data, generate a value of one or more metrics that characterize a performance or an operation of the machine learning process during the corresponding analytical period; and
  based on the one or more metric values, generate at least one of an element of fairness data or an element of performance data that characterize the application of the machine learning process to the feature vector and to the modified feature vectors during the training period.

13. The apparatus of claim 1, wherein:
the corresponding analytical period comprises a training period or a deployment period;
an application program executed by the device generates the elements of request data; and
the segmented dataset is characterized by a composition that is consistent with the composition of the segment of the dataset.

14. The apparatus of claim 1, wherein:
the dataset comprises a plurality of data elements;
the segment of the dataset comprises at least one of (i) a first subset of the data elements associated with a corresponding data type or (ii) a second subset of the data elements associated with a corresponding temporal interval;
the segmentation data specifies at least one of the corresponding data type or the corresponding temporal interval; and
the at least one processor is further configured to execute the instructions to obtain the at least one of the first subset of the data elements or the second subset of the data elements from the dataset in accordance with the segmentation data.

15. A computer-implemented method, comprising:
receiving, using at least one processor, elements of request data from a device, the elements of request data comprising a first identifier of a machine learning process, a second identifier of a dataset, a third identifier of a corresponding analytical period, feature data that specifies an input feature of the machine learning process, a feature range associated with the specified input feature, and a number of interpolation points associated with the specified feature range, and segmentation data that specifies a composition of segment of the dataset;
using the at least one processor, determining a plurality of candidate feature values within the specified feature range based on the specified number of interpolation points;
using the at least one processor, obtaining composition data associated with the machine learning process from a data repository based on the first identifier, and obtaining the dataset from the data repository based on the second identifier, the composition data characterizing a composition of a feature vector associated with the machine learning process;
performing operations, using the at least one processor, that access the segment of the dataset in accordance with the segmentation data, and that generate a segmented dataset that includes at least a portion of the accessed segment of the dataset;
generating, using the at least one processor, and based on the segmented dataset, the feature vector in accordance with the composition data, and generating, using the at least one processor, a plurality of modified feature vectors based on the feature vector, each of the modified feature vectors comprising a modified feature value of the specified input feature and a corresponding one of the plurality of candidate feature values;
based on an application of the machine learning process to the feature vector and to the modified feature vectors during the corresponding analytical period, generating, using the at least one processor, predictive output data associated with corresponding ones of the feature vector and the modified feature vectors and first explainability data associated with the specified input feature;
based on at least the third identifier, identifying, using the at least one processor, an analytical process associated with the machine learning process and the corresponding analytical period, and based on an application of the analytical process to at least a portion of the predictive output, generating, using the at least one processor, a value of one or more metrics that characterize a performance or an operation of the machine learning process during the corresponding analytical period; and
transmitting the first explainability data and the one or more metric values to the device using the at least one processor, the device being configured to execute an application program that presents a graphical representation of the first explainability data and the one or more metric values within a portion of a digital interface.

16. The computer-implemented method of claim 15, wherein:
the elements of request data further comprise sample data associated with the dataset, the sample data comprising a sample size;
the computer-implemented method further comprises:
performing, using the at least one processor, operations that process the accessed segment of the dataset and generate a downsampled segment in accordance with the sample size, the downsampled segment having a composition consistent with the composition of the segment; and
the segmented dataset comprises the downsampled segment.

17. The computer-implemented method of claim 15, wherein:
the computer-implemented method further comprises generating, using the at least one processor, data that characterizes a partial dependency plot associated with the specified input feature based on the application of the machine learning process to the obtained and modified feature vectors;
the first explainability data comprises the data that characterizes the partial dependency plot; and
the executed application program causes the device to present the partial dependency plot within the portion of the digital interface.

18. The computer-implemented method of claim 15, further comprising:
based on the application of the machine learning process to the feature vector and to the modified feature vectors, generating, using the at least one processor, second explainability data indicative of a contribution of the specified input feature to an outcome of the machine learning process, the second explainability data comprises a Shapley value feature contribution; and
transmitting, using the at least one processor, the second explainability data to the device, the executed application program causing the device to present a graphical representation of the second explainability data within an additional portion of the digital interface.

19. The computer-implemented method of claim 15, further comprising:
based on the application of the machine learning process to the feature vector and to the modified feature vectors, and based on an application of the analytical process to at least a portion of the predictive output, generating, using the at least one processor, one or more elements of fairness data associated with the machine learning process during the corresponding analytical period, the elements of fairness data comprising at least a subset of the one or more metric vales; and
transmitting, using the at least one processor, the elements of fairness data to the device, the executed application program causing the device to present a graphical representation of at least one of the elements of fairness data within an additional portion of the digital interface.

20. The computer-implemented method of claim 15, further comprising:
using the at least one processor, providing, through a first remote procedure call, the feature vector to an executed first modelling service via a first programmatic interface;
obtaining, using the at least one processor, a first element of predictive data in response to the first remote procedure call, the first element of predictive data being indicative of an outcome of the application of the machine learning process to the obtained feature vector;
using the at least one processor, providing, through second remote procedure calls, each of the modified feature vectors to an executed second modelling service through a corresponding second programmatic interface;
obtaining, using the at least one processor, a second element of predictive data in response to the each of the second remote procedure calls, each of the second elements of predictive data being indicative of an outcome of the application of the machine learning process to a corresponding one of the modified feature vectors; and
generating, using the at least one processor, the first explainability data associated with the specified input feature based on the first and second elements of predictive data.

21. An apparatus, comprising:
a memory storing instructions;
a communications interface; and
at least one processor coupled to the memory and the communications interface, the at least one processor being configured to execute the instructions to:
receive elements of request data from a device via the communications interface, the elements of request data comprising a first identifier of a trained machine learning process, a second identifier of a dataset, a third identifier of a corresponding analytical period, feature data that specifies an input feature of the trained machine learning process, a feature range associated with the specified input feature, and a number of interpolation points associated with the specified feature range, and segmentation data that specifies a composition of a segment of the dataset;
determine a plurality of candidate feature values within the specified feature range based on the specified number of interpolation points;
obtain composition data associated with the trained machine learning process from the memory based on the first identifier, and obtain the dataset from the memory based on the second identifier, the composition data characterizing a composition of a feature vector associated with the trained machine learning process;
perform operations that access the segment of the dataset in accordance with the segmentation data, and that generate a segmented dataset that includes at least a portion of the accessed segment of the dataset;
based on the portion of the segmented dataset, generate the feature vector in accordance with the composition data, and generate a plurality of modified feature vectors based on the feature vector, each of the modified feature vectors comprising a modified feature value of the specified input feature and a corresponding one of the plurality of candidate feature values;
based on an application of the trained machine learning process to the feature vector and to the modified feature vectors during the corresponding analytical period, generate predictive output data associated with corresponding ones of the feature vector and the modified feature vectors and first explainability data associated with the specified input feature;
based on at least the third identifier, identify an analytical process associated with the trained machine learning process and the corresponding analytical period, and based on an application of the analytical process to at least a portion of the predictive output data, generate monitoring data characterizing a performance or an operation of the trained machine learning process during the corresponding analytical period; and transmit the first explainability data and the monitoring data to the device via the communications interface, the device being configured to execute an application program that presents a graphical representation of the first explainability data and the monitoring data within a portion of a digital interface.

* * * * *